US011159850B2

(12) United States Patent
You

(10) Patent No.: US 11,159,850 B2
(45) Date of Patent: Oct. 26, 2021

(54) METHOD AND DEVICE FOR OBTAINING POPULARITY OF INFORMATION STREAM

(71) Applicant: SHANGHAI ZHANGMEN SCIENCE AND TECHNOLOGY CO., LTD., Shanghai (CN)

(72) Inventor: YuFeng You, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/516,285

(22) Filed: Jul. 19, 2019

(65) Prior Publication Data

US 2019/0342615 A1    Nov. 7, 2019

Related U.S. Application Data

(63) Continuation of application No. PCT/CN2017/113462, filed on Nov. 29, 2017.

(30) Foreign Application Priority Data

Jan. 19, 2017    (CN) .......................... 201710039822.4

(51) Int. Cl.
*H04N 21/466*    (2011.01)
*H04N 21/24*    (2011.01)
(Continued)

(52) U.S. Cl.
CPC ..... *H04N 21/4667* (2013.01); *H04N 21/2408* (2013.01); *H04N 21/44204* (2013.01);
(Continued)

(58) Field of Classification Search
CPC ....... H04N 21/44204; H04N 21/44222; H04N 21/4667; H04N 21/44209;
(Continued)

(56) References Cited

U.S. PATENT DOCUMENTS 9,820,004 B1 * 11/2017 Foerster ............. H04N 21/8126
2003/0050834 A1 * 3/2003 Caplan ............. H04N 21/47202
705/14.14

(Continued)

FOREIGN PATENT DOCUMENTS

CN    104111921 A    10/2014
CN    105677882 A    6/2016
(Continued)

*Primary Examiner* — Robert J Hance
(74) *Attorney, Agent, or Firm* — Bayramoglu Law Offices LLC

(57) ABSTRACT

A method for obtaining popularity of an information stream include: obtaining identifier information of each unit information block in an information stream and current local popularity corresponding to the unit information block sent by various user equipments; obtaining, based on the identifier information of each unit information block in the information stream and the current local popularity corresponding to the unit information block sent by various user equipments, current comprehensive popularity corresponding to each unit information block in the information stream; and the current comprehensive popularity corresponding to each unit information block in the information stream is sent to the user equipment, to calculate and deliver the current comprehensive popularity of each unit information block in the information stream on the network device end, so that the user equipment can display, while displaying the information stream, the current comprehensive popularity of each unit information block in the information stream.

20 Claims, 7 Drawing Sheets

(51) Int. Cl.
  *H04N 21/442* (2011.01)
  *H04N 21/482* (2011.01)
(52) U.S. Cl.
  CPC . *H04N 21/44209* (2013.01); *H04N 21/44227* (2013.01); *H04N 21/4826* (2013.01)
(58) Field of Classification Search
  CPC ......... H04N 21/44227; H04N 21/4826; H04N 21/4756; H04N 21/4316; H04N 21/252; H04N 21/6582; H04N 21/8456; H04N 21/2408; G06Q 10/107; G06Q 50/01; G06F 16/957; H04L 63/302; H04L 63/306
  See application file for complete search history.

(56) References Cited

U.S. PATENT DOCUMENTS

| | | | | |
|---|---|---|---|---|
| 2008/0187279 | A1* | 8/2008 | Gilley | H04N 9/8042 386/250 |
| 2013/0145384 | A1* | 6/2013 | Krum | G06Q 30/02 725/10 |
| 2014/0149555 | A1* | 5/2014 | Bank | H04L 65/60 709/219 |
| 2015/0217196 | A1* | 8/2015 | McCarthy | A63F 13/795 463/24 |
| 2016/0241533 | A1* | 8/2016 | Bist | G06F 16/901 |
| 2017/0251262 | A1* | 8/2017 | Bist | H04N 21/4756 |

FOREIGN PATENT DOCUMENTS

| | | |
|---|---|---|
| CN | 105930370 A | 9/2016 |
| CN | 106294334 A | 1/2017 |

\* cited by examiner

METHOD AND DEVICE FOR OBTAINING POPULARITY OF INFORMATION STREAM

CROSS REFERENCE TO THE RELATED APPLICATIONS

This is a continuation of International Application PCT/CN2017/113462, with an international filing date of Nov. 29, 2017, which claims priority to Chinese Patent Application No. 201710039822.4 filed on Jan. 19, 2017, the entire contents of which are incorporated herein by reference.

TECHNICAL FIELD

This application relates to the computer field, and in particular, to a method and a device for obtaining popularity of an information stream.

BACKGROUND

In the prior art, while an information stream is viewed by using an intelligent terminal (for example, a smartphone or a mobile computer), a current user cannot view a status in which a current information stream is viewed by another user (namely, popularity of the current information stream in an entire network). Consequently, user experience is relatively poor, and a corresponding status in which the information stream is viewed by another user equipment cannot be viewed in real time. Therefore, how to view, while an information stream is viewed, a status in which the information stream is viewed by another user equipment has become a main subject studied in the industry.

SUMMARY

An objective of this application is to provide a method and a device for obtaining popularity of an information stream, to resolve a problem of how to view, while an information stream is viewed, popularity corresponding to the information stream.

According to an aspect of this application, a method for obtaining popularity of an information stream on a network device end is provided. The method includes:

obtaining identifier information of each unit information block in an information stream and current local popularity corresponding to the unit information block sent by various user equipments;

obtaining, based on the identifier information of each unit information block in the information stream and the current local popularity corresponding to the unit information block sent by various user equipments, current comprehensive popularity corresponding to each unit information block in the information stream; and sending the current comprehensive popularity corresponding to each unit information block in the information stream to the user equipment.

Further, in the method, during the sending the current comprehensive popularity corresponding to each unit information block in the information stream to the user equipment, the method further includes:

sending binding information for each unit information block in the information stream and display progress information corresponding to the unit information block to the user equipment.

Further, in the method, before the sending the current comprehensive popularity corresponding to each unit information block in the information stream to the user equipment, the method further includes:

receiving a popularity view request for the information stream that is sent by the user equipment; and the sending the current comprehensive popularity corresponding to each unit information block in the information stream to the user equipment includes:

sending, to the user equipment based on the popularity view request, the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream.

Further, in the method, the sending the current comprehensive popularity corresponding to each unit information block in the information stream to the user equipment includes:

generating any one of a current comprehensive popularity bar, a current comprehensive popularity diagram, and a current comprehensive popularity table of the information stream based on the identifier information of each unit information block in the information stream and the current comprehensive popularity corresponding to the unit information block; and sending any one of the current comprehensive popularity bar, the current comprehensive popularity diagram, and the current comprehensive popularity table of the information stream to the user equipment.

Further, in the method, any one of the current comprehensive popularity bar, the current comprehensive popularity diagram, and the current comprehensive popularity table further includes binding information for each unit information block in the information stream and display progress information corresponding to the unit information block.

Further, in the method, before the obtaining, identifier information of each unit information block in an information stream and current local popularity corresponding to the unit information block sent by various user equipments, the method further includes:

dividing the obtained information stream based on a pre-set division manner or an original division unit of the information stream, to obtain at least one unit information block and identifier information of the at least one unit information block; and sending each unit information block in the information stream and the identifier information of the unit information block to the user equipment.

Further, in the method, the obtaining, based on the identifier information of each unit information block in the information stream and the current local popularity corresponding to the unit information block sent by various user equipments, current comprehensive popularity corresponding to each unit information block in the information stream includes:

obtaining comprehensive popularity corresponding to each unit information block in the information stream, according to a pre-set time interval, the identifier information of each unit information block in the information stream and local popularity corresponding to the unit information block sent by various user equipments.

According to another aspect of this application, a method for obtaining popularity of an information stream on a network device end is further provided. The method includes:

receiving a comprehensive popularity view request for a unit information block in a current information stream that is sent by user equipment;

calculating, based on the comprehensive popularity view request, current comprehensive popularity corresponding to each unit information block in the current information stream; and sending the current comprehensive popularity corresponding to each unit information block in the current information stream to the user equipment.

Further, in the method, before the receiving a comprehensive popularity view request for a unit information block in a current information stream that is sent by user equipment, the method further includes:

obtaining identifier information of each unit information block in an information stream and current local popularity corresponding to the unit information block sent by various user equipments; and the calculating, based on the comprehensive popularity view request, current comprehensive popularity corresponding to each unit information block in the current information stream includes:

calculating the current comprehensive popularity corresponding to each unit information block in the current information stream, based on the comprehensive popularity view request, and the identifier information of each unit information block in the information stream and the current local popularity corresponding to the unit information block.

According to another aspect of this application, a method for obtaining popularity of an information stream on a user equipment end is further provided. The method includes:

uploading identifier information of each unit information block in a local information stream and current local popularity of the unit information block to a network device;

receiving each unit information block in the information stream and current comprehensive popularity corresponding to the identifier information of the unit information block that are sent by the network device, where the comprehensive popularity is obtained by the network device based on the identifier information of each unit information block in the information stream and the current local popularity corresponding to the unit information block sent by various user equipments; and displaying, while displaying the information stream, the current comprehensive popularity corresponding to each unit information block in the information stream.

Further, in the method, during the receiving each unit information block in the information stream and current comprehensive popularity corresponding to the identifier information of the unit information block that are sent by the network device, the method further includes:

receiving binding information sent by the network device for each unit information block in the information stream and display progress information corresponding to the unit information block.

Further, in the method, before the receiving each unit information block in the information stream and current comprehensive popularity corresponding to the identifier information of the unit information block that are sent by the network device, the method further includes:

sending a popularity view request for the information stream to the network device; and the receiving each unit information block in the information stream and current comprehensive popularity corresponding to the identifier information of the unit information block that are sent by the network device includes:

receiving the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream that is returned by the network device based on the received popularity view request.

Further, in the method, the displaying, while displaying the information stream, the current comprehensive popularity corresponding to each unit information block in the information stream includes:

displaying through switching, while displaying the information stream, the current comprehensive popularity and the current local popularity that correspond to each unit information block in the information stream; or displaying, at the same time, the current comprehensive popularity or the current local popularity corresponding to each unit information block in the information stream.

Further, in the method, the receiving each unit information block in the information stream and current comprehensive popularity corresponding to the identifier information of the unit information block that are sent by the network device includes:

receiving any one of a current comprehensive popularity bar, a current comprehensive popularity diagram, and a current comprehensive popularity table of the information stream that is generated based on the identifier information of each unit information block in the information stream and the current comprehensive popularity corresponding to the unit information block and that is sent by the network device.

Further, in the method, any one of the current comprehensive popularity bar, the current comprehensive popularity diagram, and the current comprehensive popularity table further includes binding information for each unit information block in the information stream and display progress information corresponding to the unit information block.

Further, in the method, before the displaying, while displaying the information stream, the current comprehensive popularity corresponding to each unit information block in the information stream, the method further includes:

generating any one of a current local popularity bar, a current local popularity diagram, and a current local popularity table of the information stream based on the identifier information of each unit information block in the information stream and locally stored current local popularity corresponding to the unit information block.

Further, in the method, any one of the current local popularity bar, the current local popularity diagram, and the current local popularity table further includes the binding information for each unit information block in the information stream and the display progress information corresponding to the unit information block.

Further, in the method, the displaying, while displaying the information stream, the current comprehensive popularity corresponding to each unit information block in the information stream includes:

performing any one of the following display operations while displaying the information stream:

displaying, through switching, the current comprehensive popularity bar and the current local popularity bar of the information stream;

displaying the current comprehensive popularity bar or the current local popularity bar of the information stream at the same time;

displaying, through switching, the current comprehensive popularity diagram and the current local popularity diagram of the information stream;

displaying, at the same time, the current comprehensive popularity diagram or the current local popularity diagram of the information stream;

displaying, through switching, the current comprehensive popularity table and the current local popularity table of the information stream; or displaying the current comprehensive popularity table or the current local popularity table of the information stream at the same time.

Further, in the method, before the uploading identifier information of each unit information block in a local information stream and current local popularity of the unit information block to a network device, the method further includes:

receiving each unit information block in the information stream and the identifier information of the unit information block that are sent by the network device; and determining, based on the identifier information and local display duration and/or a local click-through rate of the unit information block in the information stream that corresponds to the identifier information, the current local popularity corresponding to the identifier information of each unit information block in the information stream.

According to another aspect of this application, a method for obtaining popularity of an information stream on a user equipment end is further provided. The method includes:

sending a comprehensive popularity view request for a unit information block in a current information stream to a network device; and receiving current comprehensive popularity corresponding to each unit information block in the current information stream and returned by the network device based on the comprehensive popularity view request.

According to another aspect of this application, a network device for obtaining popularity of an information stream is further provided. The network device includes:

an obtaining apparatus, configured to obtain identifier information of each unit information block in an information stream and current local popularity corresponding to the unit information block sent by various user equipments;

a determining apparatus, configured to obtain, based on the identifier information of each unit information block in the information stream and the current local popularity corresponding to the unit information block sent by various user equipments, current comprehensive popularity corresponding to each unit information block in the information stream; and a sending apparatus, configured to send the current comprehensive popularity corresponding to each unit information block in the information stream to the user equipment.

Further, in the network device, the sending apparatus is further configured to:

sending binding information for each unit information block in the information stream and display progress information corresponding to the unit information block to the user equipment.

Further, in the network device, the sending apparatus is further configured to:

receive a popularity view request for the information stream that is sent by the user equipment; and send, to the user equipment based on the popularity view request, the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream.

Further, in the network device, the sending apparatus is configured to:

generate any one of a current comprehensive popularity bar, a current comprehensive popularity diagram, and a current comprehensive popularity table of the information stream based on the identifier information of each unit information block in the information stream and the current comprehensive popularity corresponding to the unit information block; and send any one of the current comprehensive popularity bar, the current comprehensive popularity diagram, and the current comprehensive popularity table of the information stream to the user equipment.

Further, in the network device, any one of the current comprehensive popularity bar, the current comprehensive popularity diagram, and the current comprehensive popularity table further includes binding information for each unit information block in the information stream and display progress information corresponding to the unit information block.

Further, in the network device, the obtaining apparatus is further configured to:

divide the obtained information stream based on a pre-set division manner or an original division unit of the information stream, to obtain at least one unit information block and identifier information of the at least one unit information block; and send each unit information block in the information stream and the identifier information of the unit information block to the user equipment.

Further, in the network device, the determining apparatus is further configured to:

obtain comprehensive popularity corresponding to each unit information block in the information stream, according to a pre-set time interval, the identifier information of each unit information block in the information stream and local popularity corresponding to the unit information block sent by various user equipments.

According to another aspect of this application, a network device for obtaining popularity of an information stream is further provided. The network device includes:

a request receiving apparatus, configured to receive a comprehensive popularity view request for a unit information block in a current information stream that is sent by user equipment;

a calculation apparatus, configured to calculate, based on the comprehensive popularity view request, current comprehensive popularity corresponding to each unit information block in the current information stream; and a popularity sending apparatus, configured to send the current comprehensive popularity corresponding to each unit information block in the current information stream to the user equipment.

Further, in the network device, the request receiving apparatus is further configured to:

obtain identifier information of each unit information block in an information stream and current local popularity corresponding to the unit information block sent by various user equipments; and the calculation apparatus is configured to:

calculate the current comprehensive popularity corresponding to each unit information block in the current information stream, based on the comprehensive popularity view request, and the identifier information of each unit information block in the information stream and the current local popularity corresponding to the unit information block.

According to another aspect of this application, user equipment for obtaining popularity of an information stream on a user equipment end is further provided. The user equipment includes:

an uploading apparatus, configured to upload identifier information of each unit information block in a local information stream and current local popularity of the unit information block to a network device;

a receiving apparatus, configured to receive each unit information block in the information stream and current comprehensive popularity corresponding to the identifier information of the unit information block that are sent by the network device, wherein the comprehensive popularity is obtained by the network device based on current local popularity sent by various user equipments and corresponding to each unit information block in a same information stream; and a display apparatus, configured to display, while displaying the information stream, the current comprehensive popularity corresponding to each unit information block in the information stream.

Further, in the user equipment, the receiving apparatus is further configured to:

receive binding information sent by the network device for each unit information block in the information stream and display progress information corresponding to the unit information block.

Further, in the user equipment, the receiving apparatus is further configured to:

send a popularity view request for the information stream to the network device; and receive the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream that is returned by the network device based on the received popularity view request.

Further, in the user equipment, the display apparatus is configured to:

display through switching, while displaying the information stream, the current comprehensive popularity and the current local popularity that correspond to each unit information block in the information stream; or display, at the same time, the current comprehensive popularity or the current local popularity corresponding to each unit information block in the information stream.

Further, in the user equipment, the receiving apparatus is configured to:

receive any one of a current comprehensive popularity bar, a current comprehensive popularity diagram, and a current comprehensive popularity table of the information stream that is generated based on the identifier information of each unit information block in the information stream and the current comprehensive popularity corresponding to the unit information block and that is sent by the network device.

Further, in the user equipment, any one of the current comprehensive popularity bar, the current comprehensive popularity diagram, and the current comprehensive popularity table further includes binding information for each unit information block in the information stream and display progress information corresponding to the unit information block.

Further, in the user equipment, the display apparatus is further configured to:

generate any one of a current local popularity bar, a current local popularity diagram, and a current local popularity table of the information stream based on the identifier information of each unit information block in the information stream and locally stored current local popularity corresponding to the unit information block.

Further, in the user equipment, any one of the current local popularity bar, the current local popularity diagram, and the current local popularity table further includes the binding information for each unit information block in the information stream and the display progress information corresponding to the unit information block.

Further, in the user equipment, the display apparatus is configured to:

perform any one of the following display operations while displaying the information stream: displaying, through switching, the current comprehensive popularity bar and the current local popularity bar of the information stream;

displaying the current comprehensive popularity bar or the current local popularity bar of the information stream at the same time;

displaying, through switching, the current comprehensive popularity diagram and the current local popularity diagram of the information stream;

displaying, at the same time, the current comprehensive popularity diagram or the current local popularity diagram of the information stream;

displaying, through switching, the current comprehensive popularity table and the current local popularity table of the information stream; or displaying the current comprehensive popularity table or the current local popularity table of the information stream at the same time.

Further, in the user equipment, the uploading apparatus is further configured to:

receive each unit information block in the information stream and the identifier information of the unit information block that are sent by the network device; and determine, based on the identifier information and local display duration and/or a local click-through rate of the unit information block in the information stream that corresponds to the identifier information, the current local popularity corresponding to the identifier information of each unit information block in the information stream.

According to another aspect of this application, user equipment for obtaining popularity of an information stream is further provided. The user equipment includes:

a request sending apparatus, configured to send a comprehensive popularity view request for a unit information block in a current information stream to a network device; and a popularity receiving apparatus, configured to receive current comprehensive popularity corresponding to each unit information block in the current information stream and returned by the network device based on the comprehensive popularity view request.

Compared with the prior art, in this application, on a network device end, identifier information of each unit information block in an information stream sent by various user equipments and current local popularity corresponding to the unit information block are obtained; then current comprehensive popularity corresponding to each unit information block in the information stream is obtained based on the identifier information of each unit information block in the information stream sent by various user equipments and the current local popularity corresponding to the unit information block; and the current comprehensive popularity corresponding to each unit information block in the information stream is sent to the user equipment, to calculate and deliver the current comprehensive popularity of each unit information block in the information stream on the network device end, so that the user equipment can display, while displaying the information stream, the current comprehensive popularity of each unit information block in the information stream.

Further, on the network device end, binding information for each unit information block in the information stream and display progress information corresponding to the unit information block are further sent to the user equipment while the current comprehensive popularity corresponding to each unit information block in the information stream is sent to the user equipment, so that the user equipment can intuitively display the corresponding current comprehensive popularity while displaying each unit information block in the information stream in real time, and can further accurately obtain data information in the information stream that corresponds to the display progress information corresponding to each unit information block in the information stream.

Further, in this application, on a network device end, a comprehensive popularity view request for a unit information block in a current information stream that is sent by user equipment is received; then a network device calculates, based on the comprehensive popularity view request, current comprehensive popularity corresponding to each unit information block in the current information stream; and finally, the current comprehensive popularity corresponding to each unit information block in the current information stream is sent to the user equipment, so that on the network device end, the current comprehensive popularity corresponding to each unit information block in the current information stream is calculated only after the comprehensive popularity view request sent by the user equipment is received, thereby saving resources for calculating and storing the current comprehensive popularity on the network device end, and further ensuring that the current comprehensive popularity corresponding to each unit information block in the current information stream is fed back to the user equipment when the user equipment sends the comprehensive popularity view request.

Further, in this application, on a user equipment end, identifier information of each unit information block in a local information stream and current local popularity of the unit information block are uploaded to a network device; then each unit information block in the information stream and current comprehensive popularity corresponding to the identifier information of the unit information block that are sent by the network device are received, where the comprehensive popularity is obtained by the network device based on current local popularity corresponding to each unit information block in a same information stream sent by various user equipments; and finally, the current comprehensive popularity corresponding to each unit information block in the information stream is displayed on the user equipment while the information stream is displayed, so that the current comprehensive popularity corresponding to each unit information block in the information stream can be intuitively displayed while the information stream is displayed on the user equipment.

Further, the user equipment further receives, while receiving each unit information block in the information stream and the current comprehensive popularity corresponding to the identifier information of the unit information block that are sent by the network device, binding information for each unit information block in the information stream and display progress information corresponding to the unit information block that is sent by the network device, so that the user equipment can intuitively display, while displaying each unit information block in the information stream in real time, the current comprehensive popularity corresponding to the unit information block, and can further accurately obtain data information in the unit information block that corresponds to the display progress information corresponding to each unit information block in the information stream.

Further, in this application, when needing to view comprehensive popularity corresponding to a unit information block in a current information stream, user equipment actively sends a comprehensive popularity view request for the unit information block in the current information stream to a network device; and then the network device calculates, based on the comprehensive popularity view request, current comprehensive popularity corresponding to each unit information block in the current information stream, so that the user equipment can receive the current comprehensive popularity corresponding to each unit information block in the current information stream and returned by the network device based on the comprehensive popularity view request, thereby ensuring that the user equipment can view, when needing to view comprehensive popularity corresponding to the unit information block in the current information stream, the corresponding current comprehensive popularity corresponding to each unit information block in the current information stream.

BRIEF DESCRIPTION OF THE DRAWINGS

Other features, objectives, and advantages of this application become more apparent by reading detailed descriptions of non-limitative embodiments made with reference to the following accompanying drawings.

Same or similar reference numerals in the accompanying drawings indicate same or similar components.

DETAILED DESCRIPTION OF THE EMBODIMENTS

The following further describes this application in detail with reference to the accompanying drawings.

In a typical configuration of this application, a terminal, a device of a serving network, and a trusted party each include one or more processors (CPU), an input/output interface, a network interface, and a memory.

The memory may include a non-persistent memory, a random access memory (RAM), and/or a non-volatile memory in a computer-readable medium, or another form, such as a read-only memory (ROM) or a flash memory (flash RAM). The memory is an example of a computer-readable medium.

Computer-readable media include permanent and non-persistent, and removable and non-removable media, and can store information by using any method or technology. The information may be a computer-readable instruction, a data structure, a program module, or other data. Examples of the computer storage medium include but are not limited to a phase change memory (PRAM), a static RAM (SRAM), a dynamic RAM (DRAM), other types of RAMs, a ROM, an electrically erasable programmable ROM (EEPROM), a flash memory or another memory technology, a compact disk ROM (CD-ROM), a digital versatile disk (DVD) or another optical storage, a cassette tape, a tape or disk storage or another magnetic storage device or any other non-transportable medium, and may be configured to store information that can be accessed by a computing device. As defined herein, the computer-readable medium does not include non-transitory computer-readable media (transitory media), such as a modulated data signal and a carrier.

Figure 1:
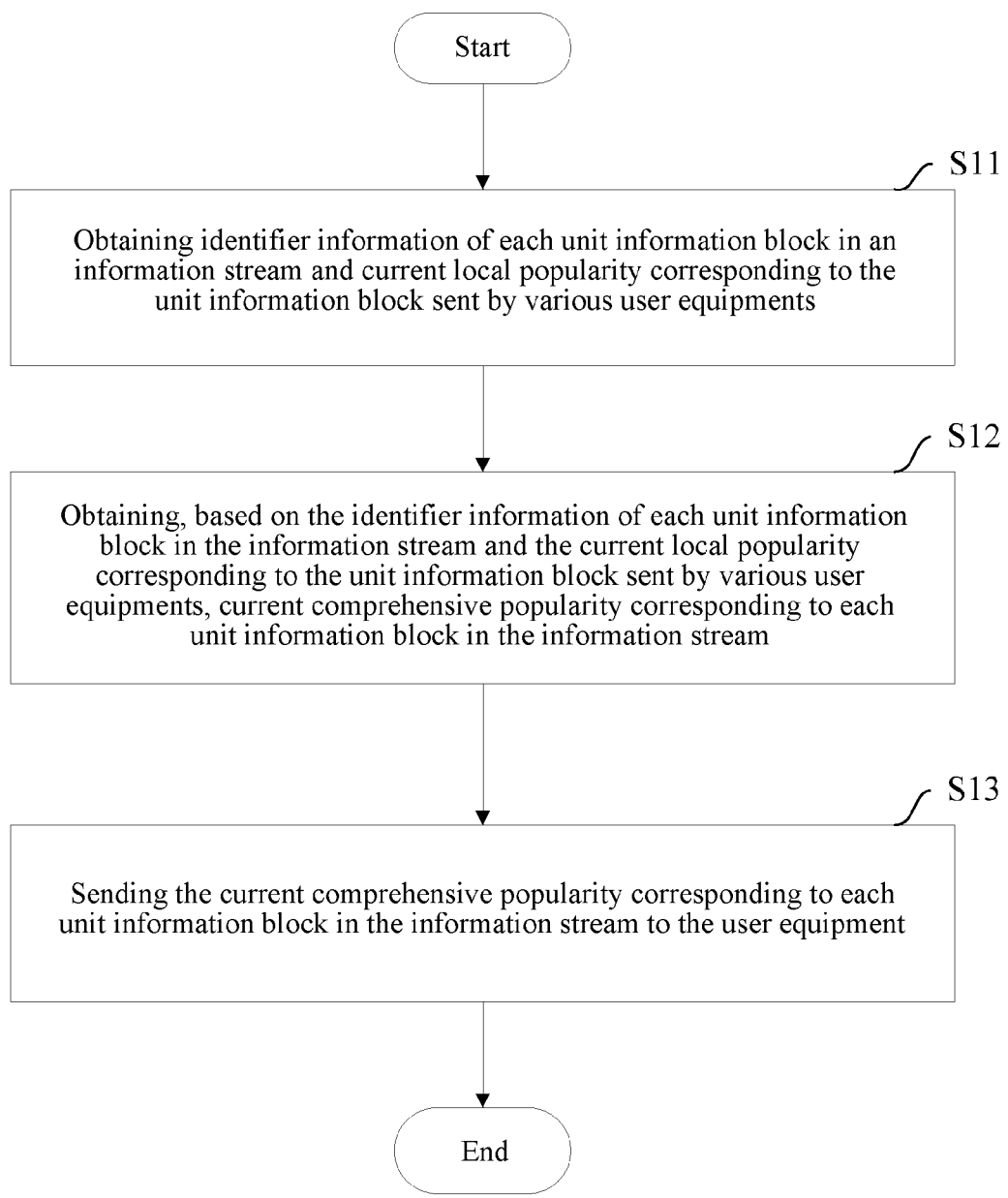
FIG. 1 is a flowchart of a method for obtaining popularity of an information stream on a network device end according to an aspect of this application.

FIG. 1 is a flowchart of a method for obtaining popularity of an information stream on a network device end according to an aspect of this application. The method is applied to a network device end in instant data communications. The method includes step S11, step S12, and step S13. In step S11, a network device obtains identifier information of each unit information block in an information stream and current local popularity corresponding to the unit information block sent by various user equipments; then in step S12, the user equipment obtains, based on the identifier information of each unit information block in the information stream and the current local popularity corresponding to the unit information block sent by various user equipments, current comprehensive popularity corresponding to each unit information block in the information stream; and finally, in step S13, the current comprehensive popularity corresponding to each unit information block in the information stream is sent to the user equipment, to calculate and deliver the current comprehensive popularity of each unit information block in the information stream on the network device end, so that the user equipment can display, while displaying the information stream, the current comprehensive popularity of each unit information block in the information stream.

It should be noted that, the information stream includes at least any one of the following: a text information stream, a multimedia information stream, and an image information stream. The text information stream may be formed by a plurality of chat messages, or may be formed by a plurality of news headlines, or may be formed by a plurality of pieces of phrase information, or may be formed by text information in a form of a long text, or the like. The multimedia information stream may be formed by a plurality of videos, or may be formed by a plurality of pieces of voice information, or may be formed by a long video, or may be formed by long voice information, or the like. The image information stream may be formed by a plurality of pieces of image information, or may be formed by a long image, or the like.

Further, before step S11 of obtaining identifier information of each unit information block in an information stream and current local popularity corresponding to the unit information block sent by various user equipments, the method further includes:

dividing the obtained information stream based on a pre-set division manner or an original division unit of the information stream, to obtain at least one unit information block and identifier information of the at least one unit information block; and sending each unit information block in the information stream and the identifier information of the unit information block to the user equipment. For example, information streams of all user equipments are stored on the network device end. If four information streams of all the user equipments are obtained by the network device and are respectively an information stream A, an information stream B, an information stream C, and an information stream D, the network device needs to uniformly divide all the obtained information streams, to divide each information stream into a plurality of unit information blocks, to obtain at least one unit information block corresponding to each information stream, namely, the information stream A: {unit information blocks: a1, a2, a3, a4, a5, and a6}, the information stream B: {unit information blocks: b1, b2, b3, b4, and b5}, the information stream C: {unit information blocks: c1, c2, c3, c4, c5, c6, and c7}, and the information stream D: {unit information blocks: d1, d2, d3, and d4}, and sends each unit information block in the information stream and identifier information of the unit information block to corresponding user equipment, to uniformly divide and deliver all the obtained information streams sent by the user equipments on the network device end.

It should be noted that, the pre-set division manner may include but is not limited: a pre-set fixed byte, a pre-set fixed image area, pre-set multimedia duration, and the like. The original division unit of the information stream may include but is not limited to a plurality of original headlines of a news text information stream, each original chat message of a chat text information stream, an original image of an image information stream, and the like. The following further separately describes division of the obtained information stream based on the pre-set division manner or the original division unit of the information stream, to obtain the at least one unit information block and the identifier information of the at least one unit information block.

For example, when the information stream is information that is relatively large as a whole such as a long text, a long image, or a long video, the information stream with information that is relatively large as a whole is divided based on the pre-set division manner, to obtain the at least one unit information block (for example, the information stream A in a form of a long image is divided into six unit information blocks based on the pre-set fixed image area, which are respectively identified by a1, a2, a3, a4, a5, and a6), to divide the information stream with the information that is relatively large as a whole. Further, if the information stream has the original division unit (for example, the information stream A is formed by a plurality of chat messages, or the information stream A is formed by a plurality of news headlines, or the information stream A is formed by a plurality of images, or the information stream A is formed by a plurality of pieces of phrase information), the information stream is divided into at least one corresponding unit information block based on the original division unit of the information stream (for example, the information stream A including six news headlines is divided based on the original division unit, to obtain six unit information blocks corresponding to the information stream A, which are respectively unit information blocks a1, a2, a3, a4, a5, and a6), to uniformly divide the information stream having the original division unit.

Further, during step S13 of sending the current comprehensive popularity corresponding to each unit information block in the information stream to the user equipment, the method further includes: sending binding information for each unit information block in the information stream and display progress information corresponding to the unit information block to the user equipment. For example, the network device binds each unit information block in the information stream A with the display progress information corresponding to the unit information block, to obtain the binding information. If the display progress information is L, the binding information of the information stream A is {the information stream A: (a1, L1), (a2, L2), (a3, L3), (a4, L4), (a5, L5), and (a6, L6)}, and the binding information corresponding to each unit information block in the information stream A is sent to the user equipment, so that the user equipment can intuitively display the corresponding current comprehensive popularity while displaying each unit information block in the information stream in real time, and can further accurately obtain data information in the information stream that corresponds to the display progress information corresponding to each unit information block in the information stream.

Further, in consideration of resource consumption required when the network device sends the current comprehensive popularity corresponding to each unit information block in the information stream to the user equipment, and resource consumption and memory consumption that are required when the user equipment receives and stores the current comprehensive popularity corresponding to each unit information block in the information stream and sent by network device, before step S13 of sending the current comprehensive popularity corresponding to each unit information block in the information stream to the user equipment, the method further includes:

receiving a popularity view request for the information stream that is sent by the user equipment; and then in step S13, sending, to the user equipment based on the popularity view request, the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream.

The following further describes step S13 by using an example from three aspects of sending the current comprehensive popularity corresponding to each unit information block in the information stream to the user equipment, or the current comprehensive popularity corresponding to the specified unit information block in the information stream, or the current comprehensive popularity corresponding to the consecutive adjacent specified unit information blocks in the information stream.

In the first aspect, for example, when the user equipment needs to obtain current comprehensive popularity corresponding to each unit information block in the information stream A, the user equipment sends a popularity view request for the information stream A to the network device, so that the network device sends the current comprehensive popularity corresponding to each unit information block in the information stream A to the user equipment only after receiving the popularity view request for the information stream A that is sent by the user equipment, that is, the current comprehensive popularity corresponding to each unit information block in the information stream A is {the information stream A: (a1, hot1), (a2, hot2), (a3, hot3), (a4, hot4), (a5, hot5), and (a6, hot6)}, thereby reducing resource consumption required when the network device delivers the current comprehensive popularity corresponding to each unit information block in the information streams of all the user equipments, reducing resource consumption required when the user equipment receives the current comprehensive popularity corresponding to each unit information block in the information stream and memory consumption for storage, and further ensuring that when required, the user equipment can obtain, based on the popularity view request, the current comprehensive popularity corresponding to each unit information block in the information stream.

In the second aspect, in consideration of resource consumption required when the network device sends the current comprehensive popularity corresponding to each unit information block in the information stream to the user equipment, and a case in which the user equipment only needs to obtain the current comprehensive popularity corresponding to the specified unit information block in the information stream, before step S13, the network device receives a popularity view request for the specified unit information block in the information stream that is sent by the user equipment; and then in step S13, the current comprehensive popularity corresponding to the specified unit information block in the information stream is sent to the user equipment based on the popularity view request.

For example, when the user equipment only needs to obtain current comprehensive popularity corresponding to the specified unit information blocks a2 and a4 in the information stream A, the user equipment sends a popularity view request for the specified unit information blocks a2 and a4 in the information stream A to the network device, so that after receiving the popularity view request for the specified unit information blocks a2 and a4 in the information stream A that is sent by the user equipment, the network device returns current comprehensive popularity hot2 and hot4, namely, {the information stream A: (a2, hot2) and (a4, hot4)}, respectively corresponding to the specified unit information blocks a2 and a4 in the information stream A to the user equipment, thereby reducing resource consumption required when the network device delivers the current comprehensive popularity corresponding to each unit information block in the information streams of all the user equipments, and further ensuring that when needing to obtain the specified unit information block in the information stream, the user equipment can obtain, based on the popularity view request, current comprehensive popularity respectively corresponding to the specified unit information block in the information stream, to implement specified view of current popularity of the specified unit information block in the information stream.

In the third aspect, in consideration of resource consumption required when the network device sends the current comprehensive popularity corresponding to each unit information block in the information stream to the user equipment and a case in which the user equipment only needs to obtain the current comprehensive popularity corresponding to the consecutive adjacent specified unit information blocks in the information stream, before step S13, the network device receives a popularity view request for the consecutive adjacent specified unit information blocks in the information stream that is sent by the user equipment; and then in step S13, the current comprehensive popularity corresponding to the consecutive adjacent specified unit information blocks in the information stream is sent to the user equipment based on the popularity view request.

For example, when the user equipment only needs to obtain current comprehensive popularity corresponding to the consecutive adjacent specified unit information blocks a2, a3, and a4 in the information stream A, the user equipment sends a popularity view request for the consecutive adjacent specified unit information blocks a2, a3, and a4 in the information stream A to the network device, so that after receiving the popularity view request for the consecutive adjacent specified unit information blocks a2, a3, and a4 in the information stream A that is sent by the user equipment, the network device returns current comprehensive popularity hot2, hot3, and hot4, namely, {the information stream A: (a2, hot2), (a3, hot3), and (a4, hot4)}, respectively corresponding to the consecutive adjacent specified unit information blocks a2, a3, and a4 in the information stream A to the user equipment, thereby reducing resource consumption required when the network device delivers the current comprehensive popularity corresponding to each unit information block in the information streams of all the user equipments, and further ensuring that when needing to obtain the consecutive adjacent specified unit information blocks in the information stream, the user equipment can obtain, based on the popularity view request, the current comprehensive popularity respectively corresponding to the consecutive adjacent specified unit information blocks in the information stream, to implement specified view of current popularity of the consecutive adjacent specified unit information blocks in the information stream.

Further, step S13 of sending the current comprehensive popularity corresponding to each unit information block in the information stream to the user equipment includes:

generating any one of a current comprehensive popularity bar, a current comprehensive popularity diagram, and a current comprehensive popularity table of the information stream based on the identifier information of each unit information block in the information stream and the current comprehensive popularity corresponding to the unit information block; and sending any one of the current comprehensive popularity bar, the current comprehensive popularity diagram, and the current comprehensive popularity table of the information stream to the user equipment.

It should be noted that, any one of the current comprehensive popularity bar, the current comprehensive popularity diagram, and the current comprehensive popularity table of the information stream may be displayed through a color change, or may be displayed on the user equipment by different levels of greyscales, or may be displayed by using curves with different thicknesses, or the like.

For example, in step S13, any one of a current comprehensive popularity bar, a current comprehensive popularity diagram, and a current comprehensive popularity table of the information stream A is generated based on identifier information of each unit information block in the information stream A and the current comprehensive popularity {the information stream A: (a1, hot1), (a2, hot2), (a3, hot3), (a4, hot4), (a5, hot5), and (a6, hot6)} corresponding to the unit information blocks, that is, the current comprehensive popularity corresponding to the identifier information of each unit information block in the information stream A is represented in a form of any one of a bar, a diagram, or a table; and the current comprehensive popularity corresponding to the identifier information of each unit information block in the information stream A is sent to the user equipment in a form of any one of a bar, a diagram, or a table, so that the user equipment can intuitively display in real time, while displaying the information stream A, overall current comprehensive popularity corresponding to each unit information block in the information stream A, and further reducing computing resources for generating, by the user equipment, the current comprehensive popularity corresponding to each unit information block in the information stream A in a form of any one of a bar, a diagram, or a table.

Further, any one of the current comprehensive popularity bar, the current comprehensive popularity diagram, and the current comprehensive popularity table further includes binding information for each unit information block in the information stream and display progress information corresponding to the unit information block.

For example, any one of the current comprehensive popularity bar, the current comprehensive popularity diagram, and the current comprehensive popularity table further includes the binding information obtained by binding each unit information block in the information stream A and the display progress information corresponding to the unit information block. If the display progress information is L, the binding information of the information stream A is {the information stream A: (a1, L1), (a2, L1), (a3, L3), (a4, L4), (a5, L5), and (a6, L6)}, and any one of the current comprehensive popularity bar, the current comprehensive popularity diagram, and the current comprehensive popularity table of the information stream A further includes binding information {the information stream A: (a1, L1), (a2, L1), (a3, L3), (a4, L4), (a5, L5), and (a6, L6)}, so that the user equipment can intuitively display, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

According to another aspect of this application, a method for obtaining popularity of an information stream on a network device end is further provided. The method is applied to a network device end in instant data communications. In the method, on the network device end, a comprehensive popularity view request for a unit information block in a current information stream that is sent by user equipment is received; then a network device calculates, based on the comprehensive popularity view request, current comprehensive popularity corresponding to each unit information block in the current information stream; and finally, the current comprehensive popularity corresponding to each unit information block in the current information stream is sent to the user equipment, so that on the network device end, the current comprehensive popularity corresponding to each unit information block in the current information stream is calculated only after the comprehensive popularity view request sent by the user equipment is received, thereby saving resources for calculating and storing the current comprehensive popularity on the network device end, and further ensuring that the current comprehensive popularity corresponding to each unit information block in the current information stream is fed back to the user equipment when the user equipment sends the comprehensive popularity view request.

Further, before the receiving a comprehensive popularity view request for a unit information block in a current information stream that is sent by user equipment, the method further includes:

obtaining identifier information of each unit information block in an information stream and current local popularity corresponding to the unit information block sent by various user equipments; and the calculating, based on the comprehensive popularity view request, current comprehensive popularity corresponding to each unit information block in the current information stream includes:

calculating, based on the comprehensive popularity view request, and the identifier information of each unit information block in the information stream, the current local popularity corresponding to the unit information block, the current comprehensive popularity corresponding to each unit information block in the current information stream.

For example, first, the network device obtains the identifier information of each unit information block in the information stream and the current local popularity {the information stream A: (a1, local hota1), (a2, local hota2), (a3, local hota3), (a4, local hota4), (a5, local hota5), and (a6, local hota6)} corresponding to each unit information block sent by various user equipments. After receiving the comprehensive popularity view request for the unit information block in the current information stream that is sent by the user equipment, the network device calculates, based on the comprehensive popularity view request, the identifier information of each unit information block in the current information stream, and the current local popularity {the information stream A: (a1, local hota1), (a2, local hota2), (a3, local hota3), (a4, local hota4), (a5, local hota5), and (a6, local hota6)} corresponding to the unit information block, the current comprehensive popularity {the information stream A: (a1, hot1), (a2, hot2), (a3, hot3), (a4, hot4), (a5, hot5), and (a6, hot6)} corresponding to each unit information block in the current information stream, so that on the network device end, the current comprehensive popularity corresponding to each unit information block in the current information stream is calculated based on the comprehensive popularity view request sent by the user equipment, thereby reducing computing resource consumption before the comprehensive popularity view request is received on the network device end and reducing storage resource consumption for storing the calculated current comprehensive popularity before the comprehensive popularity view request is received.

Further, step S12 of obtaining, based on the identifier information of each unit information block in the information stream and the current local popularity corresponding to the unit information block sent by various user equipments, current comprehensive popularity corresponding to each unit information block in the information stream includes:

obtaining, according to a pre-set time interval, the identifier information of each unit information block in the information stream sent by various user equipments, and local popularity corresponding to the unit information block, comprehensive popularity corresponding to each unit information block in the information stream.

For example, to ensure that the comprehensive popularity corresponding to each unit information block in the information stream that is obtained by the user equipment is more accurate, step S12 of updating the comprehensive popularity corresponding to each unit information block in the information stream according to a pre-set time interval T is specifically: calculating (weighted averaging or sum accumulation), according to the pre-set time interval T (for example, one hour or one day) based on the identifier information of each unit information block in the information stream and local popularity {the information stream A: (a1, local hota1), (a2, local hota2), (a3, local hota3), (a4, local hota4), (a5, local hota5), and (a6, local hota6)} corresponding to the unit information blocks sent by various user equipments, the obtained local popularity of the unit information block in the information stream A corresponding to each piece of identifier information sent by various user equipments, to obtain comprehensive popularity {the information stream A: (a1, updatehot1), (a2, updatehot2), (a3, updatehot3), (a4, updatehot4), (a5, updatehot5), and (a6, updatehot6)} corresponding to the identifier information of each unit information block in the information stream A, to periodically update the comprehensive popularity corresponding to each unit information block in the information stream on the network device end, thereby ensuring that the comprehensive popularity corresponding to each unit information block in the information stream is consistent with popularity in an actual application scenario and is accurate.

Figure 2:
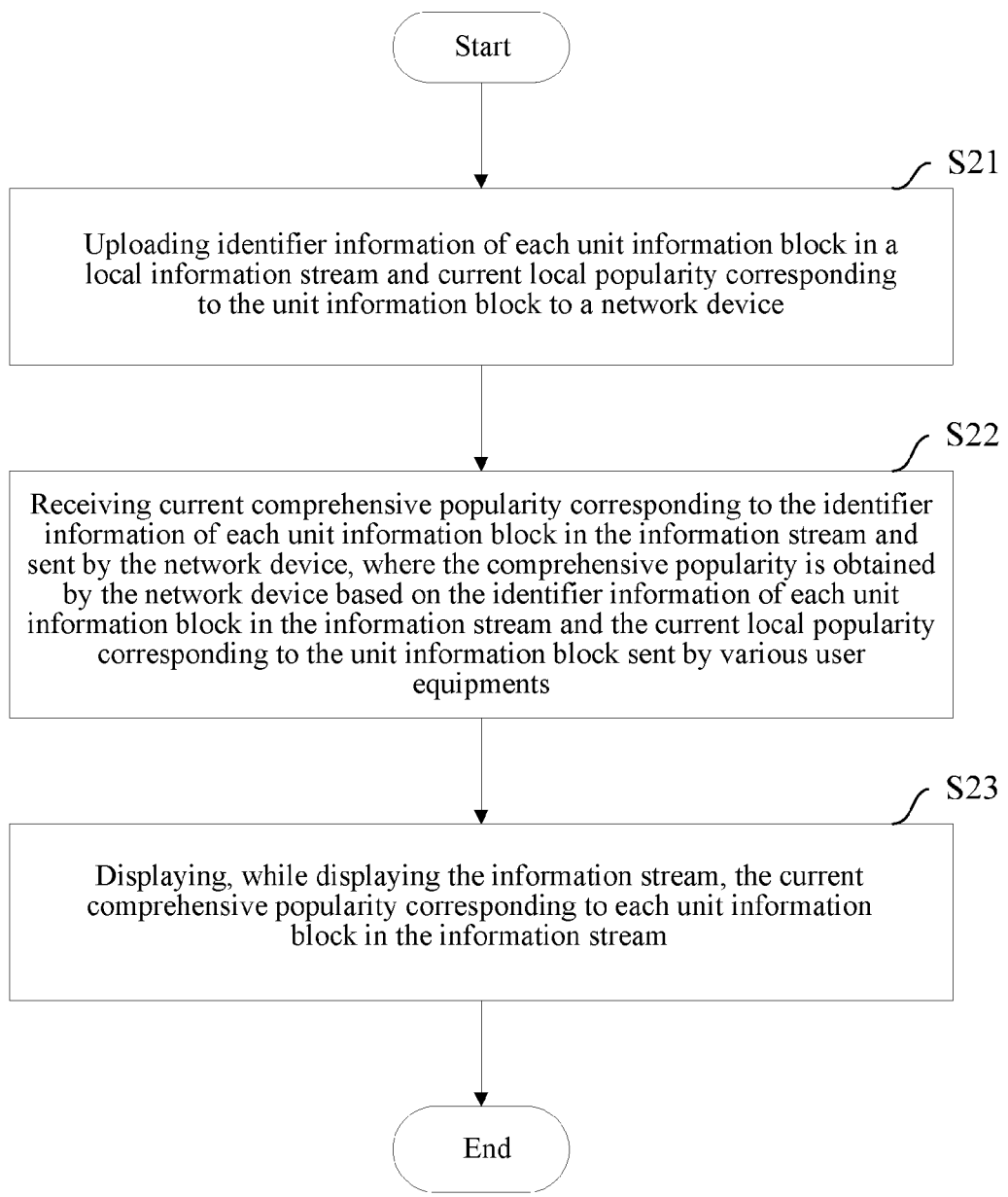
FIG. 2 is a flowchart of a method for obtaining popularity of an information stream on a user equipment end according to an aspect of this application.

FIG. 2 is a flowchart of a method for obtaining popularity of an information stream on a user equipment end according to an aspect of this application. The method is applied to a user equipment end in instant data communications. The method includes step S21, step S22, and step S23.

In step S21, identifier information of each unit information block in a local information stream and current local popularity of the unit information block are uploaded to a network device; then in step S22, each unit information block in the information stream and current comprehensive popularity corresponding to the identifier information of the unit information block that are sent by the network device are received, where the comprehensive popularity is obtained by the network device based on the identifier information of each unit information block in the information stream and the current local popularity corresponding to the unit information block sent by various user equipments; and finally, in step S23, the current comprehensive popularity corresponding to each unit information block in the information stream is displayed on the user equipment while the information stream is displayed, so that the current comprehensive popularity corresponding to each unit information block in the information stream can be intuitively displayed while the information stream is displayed on the user equipment.

It should be noted that, the information stream includes at least any one of the following: a text information stream, a multimedia information stream, and an image information stream. The text information stream may be formed by a plurality of chat messages, or may be formed by a plurality of news headlines, or may be formed by a plurality of pieces of phrase information, or may be formed by text information in a form of a long text, or the like. The multimedia information stream may be formed by a plurality of videos, or may be formed by a plurality of pieces of voice information, or may be formed by a long video, or may be formed by long voice information, or the like. The image information stream may be formed by a plurality of pieces of image information, or may be formed by a long image, or the like.

Further, before step S21 of uploading identifier information of each unit information block in a local information stream and current local popularity of the unit information block to a network device, the method further includes:

receiving each unit information block in the information stream and the identifier information of the unit information block that are sent by the network device; and determining, based on the identifier information and local display duration and/or a local click-through rate of the unit information block in the information stream that corresponds to the identifier information, the current local popularity corresponding to the identifier information of each unit information block in the information stream.

For example, the user equipment receives each unit information block in an information stream A sent by the network device, namely, the information stream A: {unit information blocks: a1, a2, a3, a4, a5, and a6}, and the user equipment obtains, according to local display duration and/or a local click-through rate of each unit information block in the information stream A, current local popularity corresponding to identifier information of each unit information block in the information stream A. As the display duration and/or the click-through rate increases, the current local popularity corresponding to the unit information block corresponding to the identifier information also increases. That is, if display duration and/or a click-through rate of the unit information block a1 increases, the current local popularity of the unit information block a1 correspondingly increases, to obtain the current local popularity, namely, {the information stream A: (a1, hota1), (a2, hota2), (a3, hota3), (a4, hota4), (a5, hota5), and (a6, hota6)} corresponding to the identifier information of each unit information block in the information stream A, so that the current local popularity corresponding to the identifier information of each unit information block in the information stream is obtained based on display duration of locally displaying each unit information block by the user equipment and/or a click-through rate of clicking each unit information block by the user equipment, thereby reflecting local popularity of each unit information block in a same information stream.

Further, during step S21 of receiving each unit information block in the information stream and current comprehensive popularity corresponding to the identifier information of the unit information block that are sent by the network device, the method further includes: receiving binding information for each unit information block in the information stream and display progress information corresponding to the unit information block that is sent by the network device. For example, when receiving current comprehensive popularity: {the information stream A: (a1, hot1), (a2, hot2), (a3, hot3), (a4, hot4), (a5, hot5), and (a6, hot6)} corresponding to each unit information block in the information stream A, the user equipment further receives binding information {the information stream A: (a1, L1), (a2, L1), (a3, L3), (a4, L4), (a5, L5), and (a6, L6)} corresponding to each unit information block in the information stream A that is sent by the network device, so that the user equipment intuitively displays, while displaying each unit information block in the information stream in real time, the current comprehensive popularity corresponding to each unit information block, and can further accurately obtain data information in the unit information block that corresponds to the display progress information corresponding to each unit information block in the information stream.

Further, in consideration of resource consumption required when the network device sends the current comprehensive popularity corresponding to each unit information block in the information stream to the user equipment, and resource consumption and memory consumption that are required when the user equipment receives and stores the current comprehensive popularity corresponding to each unit information block in the information stream and sent by network device, before step S22 of receiving each unit information block in the information stream and current comprehensive popularity corresponding to the identifier information of the unit information block that are sent by the network device, the method further includes:

sending a popularity view request for the information stream to the network device; and then in step S22, receiving the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream that is returned by the network device based on the received popularity view request.

The following further describes step S22 by using an example from three aspects of receiving, by the terminal device, the current comprehensive popularity corresponding to each unit information block in the information stream, or the current comprehensive popularity corresponding to the specified unit information block in the information stream, or the current comprehensive popularity corresponding to consecutive adjacent specified unit information blocks in the information stream that is returned by the network device based on the received popularity view request.

In the first aspect, for example, when the user equipment needs to obtain current comprehensive popularity corresponding to each unit information block in the information stream A, the user equipment sends a popularity view request for the information stream A to the network device; and when receiving the popularity view request, the network device sends the current comprehensive popularity {the information stream A: (a1, hot1), (a2, hot2), (a3, hot3), (a4, hot4), (a5, hot5), and (a6, hot6)} corresponding to each unit information block in the information stream A to the corresponding user equipment, so that the corresponding user equipment receives the current comprehensive popularity {the information stream A: (a1, hot1), (a2, hot2), (a3, hot3), (a4, hot4), (a5, hot5), and (a6, hot6)} corresponding to each unit information block in the information stream A that is returned by the network device based on the popularity view request, thereby reducing resource consumption required when the network device delivers the current comprehensive popularity corresponding to each unit information block in the information streams of all the user equipments, reducing resource consumption required when the user equipment receives the current comprehensive popularity corresponding to each unit information block in the information stream and memory consumption for storage, and further ensuring that when required, the user equipment can obtain, based on the popularity view request, the current comprehensive popularity corresponding to each unit information block in the information stream.

Figure 3:
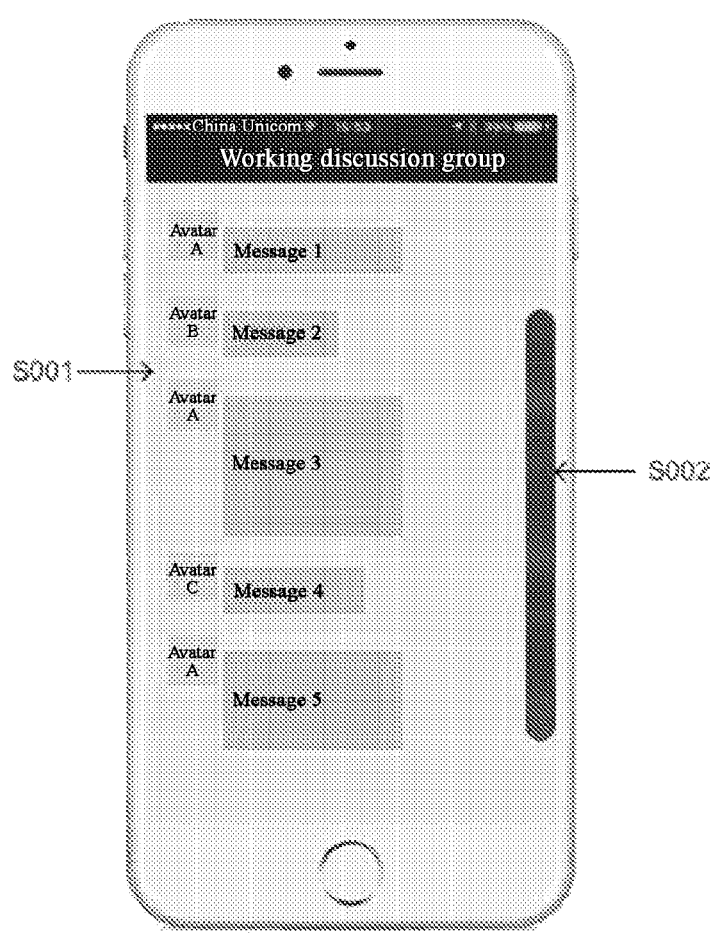
FIG. 3 is a flowchart of a method for obtaining popularity of a chat text information stream on user equipment end according to an aspect of this application.

In an embodiment of this application, as shown in FIG. 3, if the information stream is a chat text information stream S001, when needing to view the chat text information stream S001, a user sends a popularity view request for the chat text information stream S001 to the network device, and the user equipment (a smartphone terminal) receives current comprehensive popularity corresponding to each unit information block (namely, each piece of chat information) in the chat text information stream S001, represented in a form of an overall current comprehensive popularity bar S002, and returned by the network device based on the received popularity view request. A current user of the user equipment can view a change in current popularity of each piece of chat information in the chat text information stream S001 based on a color change of the current comprehensive popularity bar S002 of the chat text information stream S001. When the current comprehensive popularity bar S002 is clicked or slid, current chat information corresponding to current display progress information of the chat text information stream S001 is displayed locally, so that the user equipment intuitively displays, while displaying each unit information block in the chat text information stream S001 in real time, the current comprehensive popularity corresponding to each piece of chat information in the chat text information stream S001 and represented in a form of the overall current comprehensive popularity bar S002, and can further accurately obtain data information in the unit information block corresponding to the display progress information corresponding to each piece of chat information in the chat text information stream S001.

Figure 4:
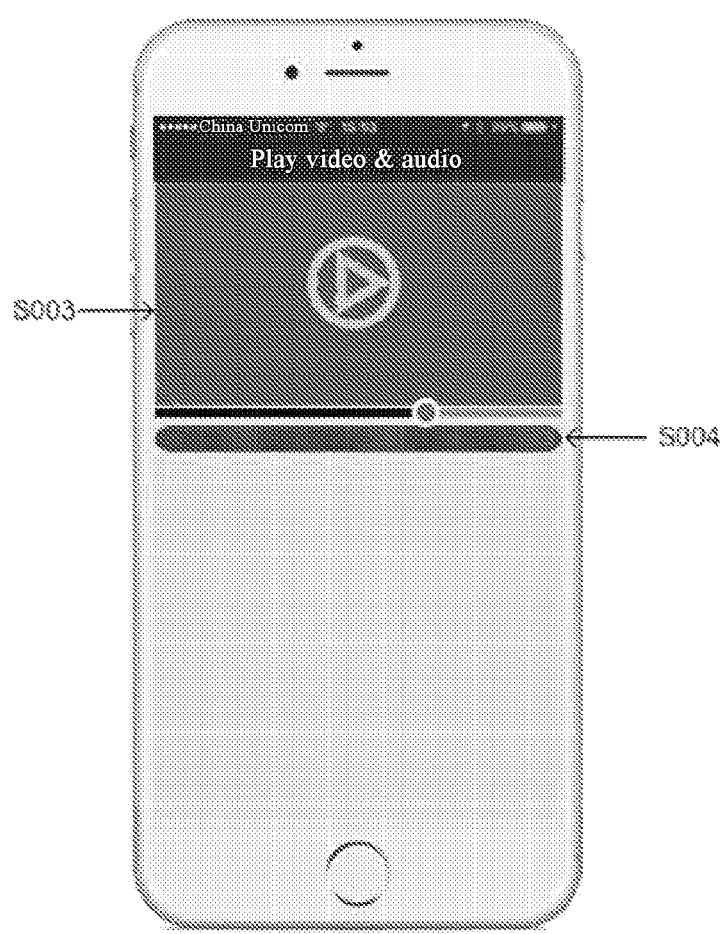
FIG. 4 is a flowchart of a method for obtaining popularity of a multimedia information stream on a user equipment end according to an aspect of this application.

In another embodiment of this application, as shown in FIG. 4, if the information stream is a multimedia information stream S003, when needing to view the multimedia information stream S003, a user sends a popularity view request for the multimedia information stream S003 to the network device, and the user equipment (smartphone terminal) receives current comprehensive popularity corresponding to each unit information block (namely, each multimedia unit information block) in the multimedia information stream S003, represented in a form of an overall current comprehensive popularity bar S004, and returned by the network device based on the received popularity view request. The user equipment displays the current comprehensive popularity bar S004 of the multimedia information stream S00 side by side when displaying the multimedia information stream S003. Each unit information block in the current comprehensive popularity bar S004 corresponds to display progress information of the multimedia information stream S003. As a color of the current comprehensive popularity bar S004 changes, a change in current popularity of each multimedia unit information block in the multimedia information stream S003 can be viewed. When the current comprehensive popularity bar S004 is clicked or slid, the current multimedia unit information block corresponding to the current display progress information of the multimedia information stream S003 is displayed locally, so that the user equipment intuitively displays, while displaying each multimedia unit information block in the multimedia information stream S003 in real time, the current comprehensive popularity corresponding to each multimedia unit information block in the multimedia information stream S003 and represented in a form of the overall current comprehensive popularity bar S004, and can further accurately obtain data information in the unit information block corresponding to the display progress information corresponding to each multimedia unit information block in the multimedia information stream S003.

In the second aspect, in consideration of resource consumption required when the network device sends the current comprehensive popularity corresponding to each unit information block in the information stream to the user equipment, and a case in which the user equipment only needs to obtain the current comprehensive popularity corresponding to the specified unit information block in the information stream, before step S22, a popularity view request for the specified unit information block in the information stream is further sent to the network device; and then in step S22, the current comprehensive popularity corresponding to the specified unit information block in the information stream and returned by the network device based on the received popularity view request is received.

For example, when the user equipment needs to obtain current comprehensive popularity corresponding to the specified unit information blocks a2 and a4 in the information stream A, the user equipment sends a popularity view request for the information stream A in the network device; and when receiving the popularity view request, the network device sends current comprehensive popularity {the information stream A: (a2, hot2) and (a4, hot4)} corresponding to the specified unit information blocks a2 and a4 in the information stream A to the corresponding user equipment, so that the corresponding user equipment receives the current comprehensive popularity {the information stream A: (a2, hot2) and (a4, hot4)} corresponding to the specified unit information blocks a2 and a4 in the information stream A and returned by the network device based on the popularity view request, thereby reducing resource consumption required when the network device delivers the current comprehensive popularity corresponding to each unit information block in the information streams of all the user equipments, and further ensuring that when needing to obtain the specified unit information block in the information stream, the user equipment can obtain, based on the popularity view request, current comprehensive popularity respectively corresponding to the specified unit information block in the information stream, to implement specified view of current popularity of the specified unit information block in the information stream.

In the third aspect, in consideration of resource consumption required when the network device sends the current comprehensive popularity corresponding to each unit information block in the information stream to the user equipment and a case in which the user equipment only needs to obtain the current comprehensive popularity corresponding to the consecutive adjacent specified unit information blocks in the information stream, before step S22, a popularity view request for the consecutive adjacent specified unit information blocks in the information stream is further sent to the network device; and then in step S22, the current comprehensive popularity corresponding to the consecutive adjacent specified unit information blocks in the information stream and returned by the network device based on the received popularity view request is received.

For example, when the user equipment needs to obtain current comprehensive popularity corresponding to the consecutive adjacent specified unit information blocks a2, a3, and a4 in the information stream A, the user equipment sends a popularity view request for the information stream A to the network device; and when receiving the popularity view request, the network device sends current comprehensive popularity {the information stream A: (a2, hot2), (a3, hot3), and (a4, hot4)} corresponding to the consecutive adjacent specified unit information blocks a2, a3, and a4 in the information stream A to the corresponding user equipment, so that the corresponding user equipment receives the current comprehensive popularity {the information stream A: (a2, hot2), (a3, hot3), and (a4, hot4)} corresponding to the consecutive adjacent specified unit information blocks a2, a3, and a4 in the information stream A and returned by the network device based on the popularity view request, thereby reducing resource consumption required when the network device delivers the current comprehensive popularity corresponding to each unit information block in the information streams of all the user equipments, and further ensuring that when needing to obtain the consecutive adjacent specified unit information blocks in the information stream, the user equipment can obtain, based on the popularity view request, the current comprehensive popularity respectively corresponding to the consecutive adjacent specified unit information blocks in the information stream, to implement specified view of current popularity of the consecutive adjacent specified unit information blocks in the information stream.

Further, step S23 of displaying, while displaying the information stream, the current comprehensive popularity corresponding to each unit information block in the information stream includes:

displaying through switching, while displaying the information stream, the current comprehensive popularity and the current local popularity that correspond to each unit information block in the information stream; or displaying, at the same time, the current comprehensive popularity or the current local popularity corresponding to each unit information block in the information stream.

For example, the user equipment displays through switching, while displaying the information stream A, current comprehensive popularity {the information stream A: (a1, hot1), (a2, hot2), (a3, hot3), (a4, hot4), (a5, hot5), and (a6, hot6)} and current local popularity {the information stream A: (a1, hota1), (a2, hota2), (a3, hota3), (a4, hota4), (a5, hota5), and (a6, hota6)} that correspond to each unit information block in the information stream A, or displays, at the same time, current comprehensive popularity {the information stream A: (a1, hot1), (a2, hot2), (a3, hot3), (a4, hot4), (a5, hot5), and (a6, hot6)} or current local popularity {the information stream A: (a1, hota1), (a2, hota2), (a3, hota3), (a4, hota4), (a5, hota5), and (a6, hota6)} corresponding to each unit information block in the information stream, to intuitively display through switching or display, at the same time, the current comprehensive popularity and the current local popularity that correspond to each unit information block in the information stream, while displaying the information stream A, so that the user equipment can obtain through comparison the current local popularity corresponding to each unit information block in the information stream and the current comprehensive popularity obtained based on various user equipments, thereby improving user experience of the user equipment.

Further, step S22 of receiving each unit information block in the information stream and current comprehensive popularity corresponding to the identifier information of the unit information block that are sent by the network device includes:

receiving any one of a current comprehensive popularity bar, a current comprehensive popularity diagram, and a current comprehensive popularity table of the information stream that is generated based on the identifier information of each unit information block in the information stream and the current comprehensive popularity corresponding to the unit information block and that is sent by the network device.

For example, when computing resources of the network device are sufficient and computing resources of the user equipment are strained, any one of a current comprehensive popularity bar, a current comprehensive popularity diagram, and a current comprehensive popularity table of the information stream A is generated based on the current comprehensive popularity {an information stream A: (a1, hot1), (a2, hot2), (a3, hot3), (a4, hot4), (a5, hot5), and (a6, hot6)} corresponding to the unit information blocks in the information stream A. That is, the current comprehensive popularity corresponding to each unit information block in the information stream A is represented in a form of any one of a bar, a diagram, or a table. The current comprehensive popularity corresponding to each unit information block in the information stream A is sent to the user equipment in the form of any one of a bar, a diagram, or a table. The user equipment receives any one of the current comprehensive popularity bar, the current comprehensive popularity diagram, and the current comprehensive popularity table of the information stream that is generated based on the identifier information of each unit information block in the information stream and the current comprehensive popularity corresponding to the unit information block and that is sent by the network device, thereby reducing computing resources for generating, by the user equipment, any one of the current comprehensive popularity bar, the current comprehensive popularity diagram, and the current comprehensive popularity table of the information stream based on each unit information block in the information stream.

Further, any one of the current comprehensive popularity bar, the current comprehensive popularity diagram, and the current comprehensive popularity table further includes binding information for each unit information block in the information stream and display progress information corresponding to the unit information block.

For example, any one of the current comprehensive popularity bar, the current comprehensive popularity diagram, and the current comprehensive popularity table further includes binding information obtained by binding each unit information block in the information stream A with display progress information corresponding to the unit information block. If the display progress information is L, the binding information of the information stream A is {the information stream A: (a1, L1), (a2, L1), (a3, L3), (a4, L4), (a5, L5), and (a6, L6)}, any one of the current comprehensive popularity bar, the current comprehensive popularity diagram, and the current comprehensive popularity table of the information stream A further includes the binding information {the information stream A: (a1, L1), (a2, L1), (a3, L3), (a4, L4), (a5, L5), and (a6, L6)}, so that the user equipment intuitively displays, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

Further, before step S23 of displaying, while displaying the information stream, the current comprehensive popularity corresponding to each unit information block in the information stream, the method further includes:

generating any one of a current local popularity bar, a current local popularity diagram, and a current local popularity table of the information stream based on the identifier information of each unit information block in the locally stored information stream and the current local popularity corresponding to the unit information block.

For example, when needing to view the identifier information of each unit information block in the local information stream A and overall popularity of the current local popularity corresponding to the unit information block, the user equipment generates, based on the identifier information of each unit information block in the locally stored information stream A and the current local popularity corresponding to the unit information block, any one of the current local popularity bar, the current local popularity diagram, and the current local popularity table of the information stream A. That is, the current local popularity corresponding to each unit information block in the information stream A is represented in a form of any one of a bar, a diagram, or a table, to generate the overall popularity of the current local popularity corresponding to each unit information block in the locally stored information stream, so that a user of the user equipment can view the overall popularity of the current local popularity corresponding to each unit information block in the currently viewed information stream, thereby improving user experience of the user equipment.

Further, any one of the current local popularity bar, the current local popularity diagram, and the current local popularity table further includes the binding information for each unit information block in the information stream and the display progress information corresponding to the unit information block.

For example, any one of the current local popularity bar, the current local popularity diagram, and the current local popularity table further includes binding information obtained by binding each unit information block of the information stream A with display progress information corresponding the unit information block. If the display progress information is L, the binding information of the information stream A is {the information stream A: (a1, L1), (a2, L1), (a3, L3), (a4, L4), (a5, L5), and (a6, L6)}, any one of the current comprehensive popularity bar, the current comprehensive popularity diagram, and the current comprehensive popularity table of the information stream A further includes the binding information {an information stream A: (a1, L1), (a2, L1), (a3, L3), (a4, L4), (a5, L5), and (a6, L6)}, so that the user equipment intuitively displays, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

Further, step S23 of displaying, while displaying the information stream, the current comprehensive popularity corresponding to each unit information block in the information stream includes:

performing any one of the following display operations while displaying the information stream:

displaying, through switching, the current comprehensive popularity bar and the current local popularity bar of the information stream;

displaying the current comprehensive popularity bar or the current local popularity bar of the information stream at the same time;

displaying, through switching, the current comprehensive popularity diagram and the current local popularity diagram of the information stream;

displaying, at the same time, the current comprehensive popularity diagram or the current local popularity diagram of the information stream;

displaying, through switching, the current comprehensive popularity table and the current local popularity table of the information stream; or displaying the current comprehensive popularity table or the current local popularity table of the information stream at the same time. For example, while displaying the information stream A, the user equipment displays through switching, for the information stream A in a form of an overall bar/diagram/table, the current comprehensive popularity {the information stream A: (a1, hot1), (a2, hot2), (a3, hot3), (a4, hot4), (a5, hot5), and (a6, hot6)} and the current local popularity {the information stream A: (a1, hota1), (a2, hota2), (a3, hota3), (a4, hota4), (a5, hota5), and (a6, hota6)} that correspond to each unit information block, or displays, at the same time for the information stream A in a form of an overall bar/diagram/table, the current comprehensive popularity {the information stream A: (a1, hot1), (a2, hot2), (a3, hot3), (a4, hot4), (a5, hot5), and (a6, hot6)} or the current local popularity {the information stream A: (a1, hota1), (a2, hota2), (a3, hota3), (a4, hota4), (a5, hota5), and (a6, hota6)} corresponding to each unit information block, to intuitively display through switching or display, at the same time, the current comprehensive popularity bar/diagram/table and the corresponding current local popularity bar/diagram/table of the information stream while displaying the information stream A, so that the user equipment can obtain through comparison the current comprehensive popularity bar/diagram/table and the corresponding current local popularity bar/diagram/table of the information stream, thereby improving user experience of the user equipment.

According to another aspect of this application, a method for obtaining popularity of an information stream on a user equipment end is further provided. The method is applied to a user equipment end in instant data communications. In the method, when needing to view comprehensive popularity corresponding to unit information block in a current information stream, the user equipment actively sends a comprehensive popularity view request for the unit information block in the current information stream to a network device; and then the network device calculates, based on the comprehensive popularity view request, current comprehensive popularity {an information stream A: (a1, local hota1), (a2, local hota2), (a3, local hota3), (a4, local hota4), (a5, local hota5), and (a6, local hota6)} corresponding to each unit information block in the current information stream, so that the user equipment can receive the current comprehensive popularity {the information stream A: (a1, local hota1), (a2, local hota2), (a3, local hota3), (a4, local hota4), (a5, local hota5), and (a6, local hota6)} corresponding to each unit information block in the current information stream and returned by the network device based on the comprehensive popularity view request, thereby ensuring that the user equipment can view, when needing to view the comprehensive popularity corresponding to the unit information block in the current information stream, the corresponding current comprehensive popularity corresponding to each unit information block in the current information stream.

Figure 5:
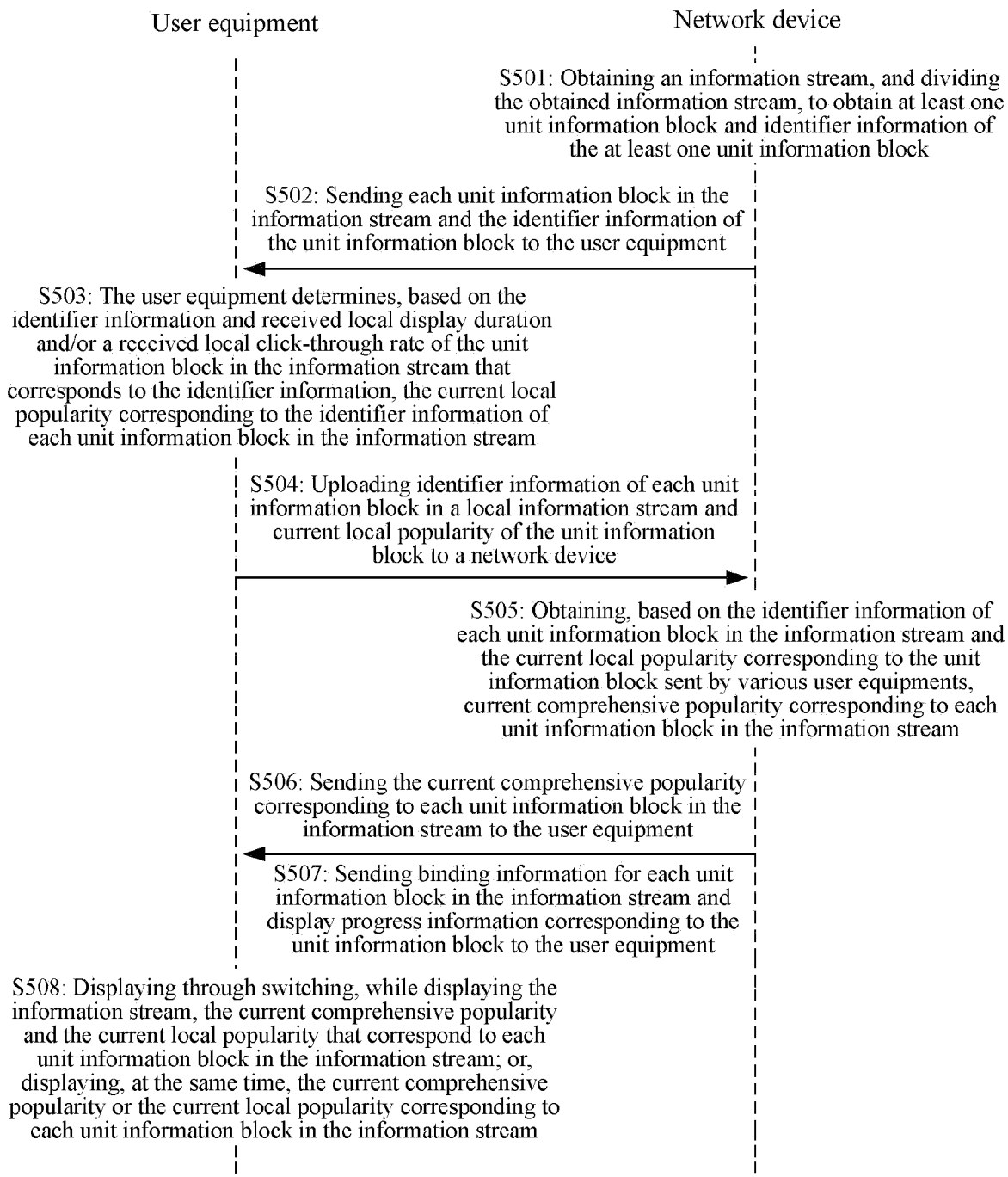
FIG. 5 is a flowchart of a system method for obtaining popularity of an information stream according to an aspect of this application.

FIG. 5 is a flowchart of a system method for obtaining popularity of an information stream according to an aspect of this application. The system includes a network device and user equipment. The system method includes step S501, step S502, step S503, step S504, step S505, step S506, step S507, and step S508. In step S501, the network device obtains an information stream, and divides the obtained information stream, to obtain at least one unit information block and identifier information of the at least one unit information block.

In step S502, the network device sends each unit information block in the information stream and the identifier information of the unit information block to the user equipment.

In step S503, the user equipment determines, based on the identifier information and received local display duration and/or a received local click-through rate of the unit information block in the information stream that corresponds to the identifier information, current local popularity corresponding to the identifier information of each unit information block in the information stream.

In step S504, the terminal device uploads identifier information of each unit information block in a local information stream and current local popularity of the unit information block to a network device.

In step S505, the network device obtains, based on the identifier information of each unit information block in the information stream and the current local popularity corresponding to the unit information block sent by various user equipments, current comprehensive popularity corresponding to each unit information block in the information stream.

In step S506, the network device sends the current comprehensive popularity corresponding to each unit information block in the information stream to the user equipment.

In step S507, the network device sends binding information for each unit information block in the information stream and display progress information corresponding to the unit information block to the user equipment.

In step S508, the user equipment displays through switching, while displaying the information stream, the current comprehensive popularity and the current local popularity that correspond to each unit information block in the information stream; or displays, at the same time, the current comprehensive popularity or the current local popularity corresponding to each unit information block in the information stream.

Figure 6:
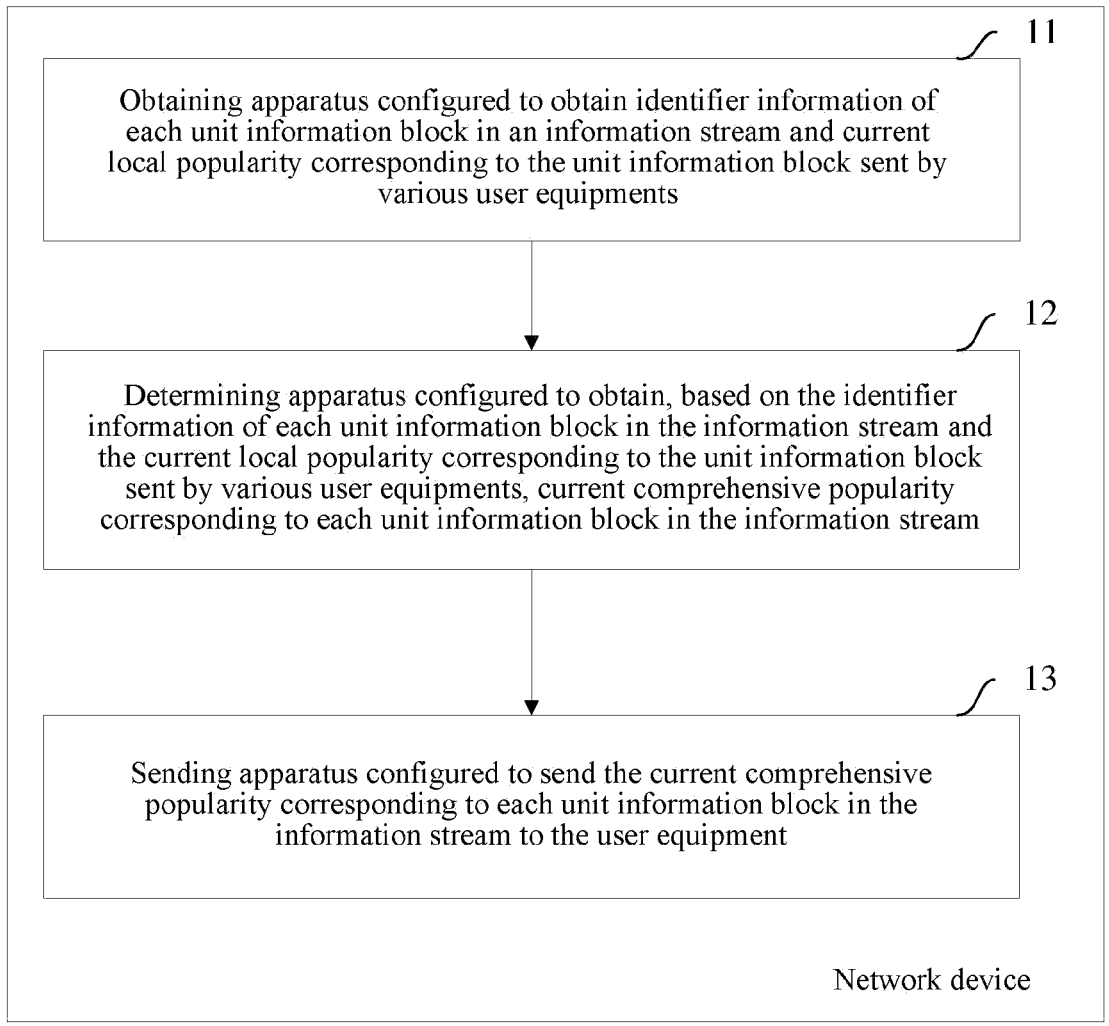
FIG. 6 is a schematic structural diagram of a network device for obtaining popularity of an information stream according to an aspect of this application.

FIG. 6 is a schematic structural diagram of a network device for obtaining popularity of an information stream according to an aspect of this application. The network device is applied to a network device end in instant data communications. The network device includes an obtaining apparatus 11, a determining apparatus 12, and a sending apparatus 13.

The obtaining apparatus 11 is configured to obtain identifier information of each unit information block in an information stream and current local popularity corresponding to the unit information block sent by various user equipments; then the determining apparatus 12 is configured to obtain, based on the identifier information of each unit information block in the information stream and the current local popularity corresponding to the unit information block sent by various user equipments, current comprehensive popularity corresponding to each unit information block in the information stream; and finally, the sending apparatus 13 is configured to send the current comprehensive popularity corresponding to each unit information block in the information stream to the user equipment, to calculate and deliver the current comprehensive popularity of each unit information block in the information stream on the network device end, so that the user equipment can display, while displaying the information stream, the current comprehensive popularity of each unit information block in the information stream.

It should be noted that, the information stream includes at least any one of the following: a text information stream, a multimedia information stream, and an image information stream. The text information stream may be formed by a plurality of chat messages, or may be formed by a plurality of news headlines, or may be formed by a plurality of pieces of phrase information, or may be formed by text information in a form of a long text, or the like. The multimedia information stream may be formed by a plurality of videos, or may be formed by a plurality of pieces of voice information, or may be formed by a long video, or may be formed by long voice information, or the like. The image information stream may be formed by a plurality of pieces of image information, or may be formed by a long image, or the like.

Further, the obtaining apparatus 11 is further configured to:

divide the obtained information stream based on a pre-set division manner or an original division unit of the information stream, to obtain at least one unit information block and identifier information of the at least one unit information block; and send each unit information block in the information stream and the identifier information of the unit information block to the user equipment.

For example, information streams of all user equipments are stored on the network device end. If four information streams of all the user equipments are obtained by the network device and are respectively an information stream A, an information stream B, an information stream C, and an information stream D, the network device needs to uniformly divide all the obtained information streams, to divide each information stream into a plurality of unit information blocks, to obtain at least one unit information block corresponding to each information stream, namely, the information stream A: {unit information blocks: a1, a2, a3, a4, a5, and a6}, the information stream B: {unit information blocks: b1, b2, b3, b4, and b5}, the information stream C: {unit information blocks: c1, c2, c3, c4, c5, c6, and c7}, and the information stream D: {unit information blocks: d1, d2, d3, and d4}, and sends each unit information block in the information stream to corresponding user equipment, to uniformly divide and deliver all the obtained information streams sent by the user equipments on the network device end.

It should be noted that, the pre-set division manner may include but is not limited: a pre-set fixed byte, a pre-set fixed image area, pre-set multimedia duration, and the like. The original division unit of the information stream may include but is not limited to a plurality of original headlines of a news text information stream, each original chat message of a chat text information stream, an original image of an image information stream, and the like. The following further separately describes division of the obtained information stream based on the pre-set division manner or the original division unit of the information stream, to obtain the at least one unit information block and the identifier information of the at least one unit information block.

For example, when the information stream is information that is relatively large as a whole such as a long text, a long image, or a long video, the information stream with information that is relatively large as a whole is divided based on the pre-set division manner, to obtain the at least one unit information block (for example, the information stream A in a form of a long image is divided into six unit information blocks based on the pre-set fixed image area, which are respectively identified by a1, a2, a3, a4, a5, and a6), to divide the information stream with the information that is relatively large as a whole. Further, if the information stream has the original division unit (for example, the information stream A is formed by a plurality of chat messages, or the information stream A is formed by a plurality of news headlines, or the information stream A is formed by a plurality of images, or the information stream A is formed by a plurality of pieces of phrase information), the information stream is divided into at least one corresponding unit information block based on the original division unit of the information stream (for example, the information stream A including six news headlines is divided based on the original division unit, to obtain six unit information blocks corresponding to the information stream A, which are respectively unit information blocks a1, a2, a3, a4, a5, and a6), to uniformly divide the information stream having the original division unit.

Further, the sending apparatus 13 is further configured to: send binding information for each unit information block in the information stream and display progress information corresponding to the unit information block to the user equipment. For example, the network device binds each unit information block in the information stream A with the display progress information corresponding to the unit information block, to obtain the binding information. If the display progress information is L, the binding information of the information stream A is {the information stream A: (a1, L1), (a2, L1), (a3, L3), (a4, L4), (a5, L5), and (a6, L6)}, and the binding information corresponding to each unit information block in the information stream A is sent to the user equipment, so that the user equipment can intuitively display the corresponding current comprehensive popularity while displaying each unit information block in the information stream in real time, and can further accurately obtain data information in the information stream that corresponds to the display progress information corresponding to each unit information block in the information stream.

Further, in consideration of resource consumption required when the network device sends the current comprehensive popularity corresponding to each unit information block in the information stream to the user equipment, and resource consumption and memory consumption that are required when the user equipment receives and stores the current comprehensive popularity corresponding to each unit information block in the information stream and sent by network device, the sending apparatus 13 is further configured to:

receive a popularity view request for the information stream that is sent by the user equipment; and then the sending apparatus 13 sends, to the user equipment based on the popularity view request, the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream.

The following further describes the sending apparatus 13 by using an example from three aspects of sending the current comprehensive popularity corresponding to each unit information block in the information stream to the user equipment, or the current comprehensive popularity corresponding to the specified unit information block in the information stream, or the current comprehensive popularity corresponding to the consecutive adjacent specified unit information blocks in the information stream.

In the first aspect, for example, when the user equipment needs to obtain current comprehensive popularity corresponding to each unit information block in the information stream A, the user equipment sends a popularity view request for the information stream A to the network device, so that the network device sends the current comprehensive popularity corresponding to each unit information block in the information stream A to the user equipment only after receiving the popularity view request for the information stream A that is sent by the user equipment, that is, the current comprehensive popularity corresponding to each unit information block in the information stream A is {the information stream A: (a1, hot1), (a2, hot2), (a3, hot3), (a4, hot4), (a5, hot5), and (a6, hot6)}, thereby reducing resource consumption required when the network device delivers the current comprehensive popularity corresponding to each unit information block in the information streams of all the user equipments, reducing resource consumption required when the user equipment receives the current comprehensive popularity corresponding to each unit information block in the information stream and memory consumption for storage, and further ensuring that when required, the user equipment can obtain, based on the popularity view request, the current comprehensive popularity corresponding to each unit information block in the information stream.

In the second aspect, in consideration of resource consumption required when the network device sends the current comprehensive popularity corresponding to each unit information block in the information stream to the user equipment, and a case in which the user equipment only needs to obtain the current comprehensive popularity corresponding to the specified unit information block in the information stream, before step S13, the network device receives a popularity view request for the specified unit information block in the information stream that is sent by the user equipment; and then in step S13, the current comprehensive popularity corresponding to the specified unit information block in the information stream is sent to the user equipment based on the popularity view request.

For example, when the user equipment only needs to obtain current comprehensive popularity corresponding to the specified unit information blocks a2 and a4 in the information stream A, the user equipment sends a popularity view request for the specified unit information blocks a2 and a4 in the information stream A to the network device, so that after receiving the popularity view request for the specified unit information blocks a2 and a4 in the information stream A that is sent by the user equipment, the network device returns current comprehensive popularity hot2 and hot4, namely, {the information stream A: (a2, hot2) and (a4, hot4)}, respectively corresponding to the specified unit information blocks a2 and a4 in the information stream A to the user equipment, thereby reducing resource consumption required when the network device delivers the current comprehensive popularity corresponding to each unit information block in the information streams of all the user equipments, and further ensuring that when needing to obtain the specified unit information block in the information stream, the user equipment can obtain, based on the popularity view request, current comprehensive popularity respectively corresponding to the specified unit information block in the information stream, to implement specified view of current popularity of the specified unit information block in the information stream.

In the third aspect, in consideration of resource consumption required when the network device sends the current comprehensive popularity corresponding to each unit information block in the information stream to the user equipment and a case in which the user equipment only needs to obtain the current comprehensive popularity corresponding to the consecutive adjacent specified unit information blocks in the information stream, before step S13, the network device receives a popularity view request for the consecutive adjacent specified unit information blocks in the information stream that is sent by the user equipment; and then in step S13, the current comprehensive popularity corresponding to the consecutive adjacent specified unit information blocks in the information stream is sent to the user equipment based on the popularity view request.

For example, when the user equipment only needs to obtain current comprehensive popularity corresponding to the consecutive adjacent specified unit information blocks a2, a3, and a4 in the information stream A, the user equipment sends a popularity view request for the consecutive adjacent specified unit information blocks a2, a3, and a4 in the information stream A to the network device, so that after receiving the popularity view request for the consecutive adjacent specified unit information blocks a2, a3, and a4 in the information stream A that is sent by the user equipment, the network device returns current comprehensive popularity hot2, hot3, and hot4, namely, {the information stream A: (a2, hot2), (a3, hot3), and (a4, hot4)}, respectively corresponding to the consecutive adjacent specified unit information blocks a2, a3, and a4 in the information stream A to the user equipment, thereby reducing resource consumption required when the network device delivers the current comprehensive popularity corresponding to each unit information block in the information streams of all the user equipments, and further ensuring that when needing to obtain the consecutive adjacent specified unit information blocks in the information stream, the user equipment can obtain, based on the popularity view request, the current comprehensive popularity respectively corresponding to the consecutive adjacent specified unit information blocks in the information stream, to implement specified view of current popularity of the consecutive adjacent specified unit information blocks in the information stream.

Further, the sending apparatus 13 is configured to:

generate any one of a current comprehensive popularity bar, a current comprehensive popularity diagram, and a current comprehensive popularity table of the information stream based on the identifier information of each unit information block in the information stream and the current comprehensive popularity corresponding to the unit information block; and send any one of the current comprehensive popularity bar, the current comprehensive popularity diagram, and the current comprehensive popularity table of the information stream to the user equipment.

For example, the sending apparatus 13 generates any one of a current comprehensive popularity bar, a current comprehensive popularity diagram, and a current comprehensive popularity table of the information stream A based on identifier information of each unit information block in the information stream A and the current comprehensive popularity {the information stream A: (a1, hot1), (a2, hot2), (a3, hot3), (a4, hot4), (a5, hot5), and (a6, hot6)} corresponding to the unit information blocks, that is, the current comprehensive popularity corresponding to the identifier information of each unit information block in the information stream A is represented in a form of any one of a bar, a diagram, or a table; and sends the current comprehensive popularity corresponding to the identifier information of each unit information block in the information stream A to the user equipment in a form of any one of a bar, a diagram, or a table, so that the user equipment can intuitively display in real time, while displaying the information stream A, overall current comprehensive popularity corresponding to each unit information block in the information stream A, and further reducing computing resources for generating, by the user equipment, the current comprehensive popularity corresponding to each unit information block in the information stream A in a form of any one of a bar, a diagram, or a table.

Further, any one of the current comprehensive popularity bar, the current comprehensive popularity diagram, and the current comprehensive popularity table further includes binding information for each unit information block in the information stream and display progress information corresponding to the unit information block.

For example, any one of the current comprehensive popularity bar, the current comprehensive popularity diagram, and the current comprehensive popularity table further includes binding information obtained by binding each unit information block in the information stream A with display progress information corresponding to the unit information block. If the display progress information is L, the binding information of the information stream A is {the information stream A: (a1, L1), (a2, L1), (a3, L3), (a4, L4), (a5, L5), and (a6, L6)}, any one of the current comprehensive popularity bar, the current comprehensive popularity diagram, and the current comprehensive popularity table of the information stream A further includes the binding information {the information stream A: (a1, L1), (a2, L1), (a3, L3), (a4, L4), (a5, L5), and (a6, L6)}, so that the user equipment can intuitively display, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

According to another aspect of this application, a network device for obtaining popularity of an information stream is further provided. The network device is applied to a network device end in instant data communications. The network device includes a request receiving apparatus, a calculation apparatus, and a popularity sending apparatus. The request receiving apparatus receives a comprehensive popularity view request for a unit information block in a current information stream that is sent by user equipment; then the calculation apparatus calculates, based on the comprehensive popularity view request, current comprehensive popularity corresponding to each unit information block in the current information stream; and finally, the popularity sending apparatus sends the current comprehensive popularity corresponding to each unit information block in the current information stream to the user equipment, so that on the network device end, the current comprehensive popularity corresponding to each unit information block in the current information stream is calculated only after the comprehensive popularity view request sent by the user equipment is received, thereby saving resources for calculating and storing the current comprehensive popularity on the network device end, and further ensuring that the current comprehensive popularity corresponding to each unit information block in the current information stream is fed back to the user equipment when the user equipment sends the comprehensive popularity view request.

Further, the request receiving apparatus is further configured to:

obtain identifier information of each unit information block in an information stream and current local popularity corresponding to the unit information block sent by various user equipments.

The calculation apparatus is configured to:

calculate, based on the comprehensive popularity view request, and the identifier information of each unit information block in the information stream, the current local popularity corresponding to the unit information block, the current comprehensive popularity corresponding to each unit information block in the current information stream.

For example, first, the network device obtains the identifier information of each unit information block in the information stream and the current local popularity {the information stream A: (a1, local hota1), (a2, local hota2), (a3, local hota3), (a4, local hota4), (a5, local hota5), and (a6, local hota6)} corresponding to each unit information block sent by various user equipments. After receiving the comprehensive popularity view request for the unit information block in the current information stream that is sent by the user equipment, the network device calculates, based on the comprehensive popularity view request, the identifier information of each unit information block in the current information stream, and the current local popularity {the information stream A: (a1, local hota1), (a2, local hota2), (a3, local hota3), (a4, local hota4), (a5, local hota5), and (a6, local hota6)} corresponding to the unit information block, the current comprehensive popularity {the information stream A: (a1, hot1), (a2, hot2), (a3, hot3), (a4, hot4), (a5, hot5), and (a6, hot6)} corresponding to each unit information block in the current information stream, so that on the network device end, the current comprehensive popularity corresponding to each unit information block in the current information stream is calculated based on the comprehensive popularity view request sent by the user equipment, thereby reducing computing resource consumption before the comprehensive popularity view request is received on the network device end and reducing storage resource consumption for storing the calculated current comprehensive popularity before the comprehensive popularity view request is received.

Further, the determining apparatus 12 is configured to:

Obtain the comprehensive popularity corresponding to each unit information block in the information stream according to a pre-set time interval, the identifier information of each unit information block in the information stream and local popularity corresponding to the unit information block sent by various user equipments.

For example, to ensure that the comprehensive popularity corresponding to each unit information block in the information stream that is obtained by the user equipment is more accurate, the updating, by the determining apparatus 12, the comprehensive popularity corresponding to each unit information block in the information stream according to a pre-set time interval T is specifically: calculating (weighted averaging or sum accumulation), according to the pre-set time interval T (for example, one hour or one day) based on the identifier information of each unit information block in the information stream and local popularity {the information stream A: (a1, local hota1), (a2, local hota2), (a3, local hota3), (a4, local hota4), (a5, local hota5), and (a6, local hota6)} corresponding to the unit information blocks sent by various user equipments, the obtained local popularity of the unit information block in the information stream A corresponding to each piece of identifier information sent by various user equipments, to obtain comprehensive popularity {the information stream A: (a1, updatehot1), (a2, updatehot2), (a3, updatehot3), (a4, updatehot4), (a5, updatehot5), and (a6, updatehot6)} corresponding to the identifier information of each unit information block in the information stream A, to periodically update the comprehensive popularity corresponding to each unit information block in the information stream on the network device end, thereby ensuring that the comprehensive popularity corresponding to each unit information block in the information stream is consistent with popularity in an actual application scenario and is accurate.

Figure 7:
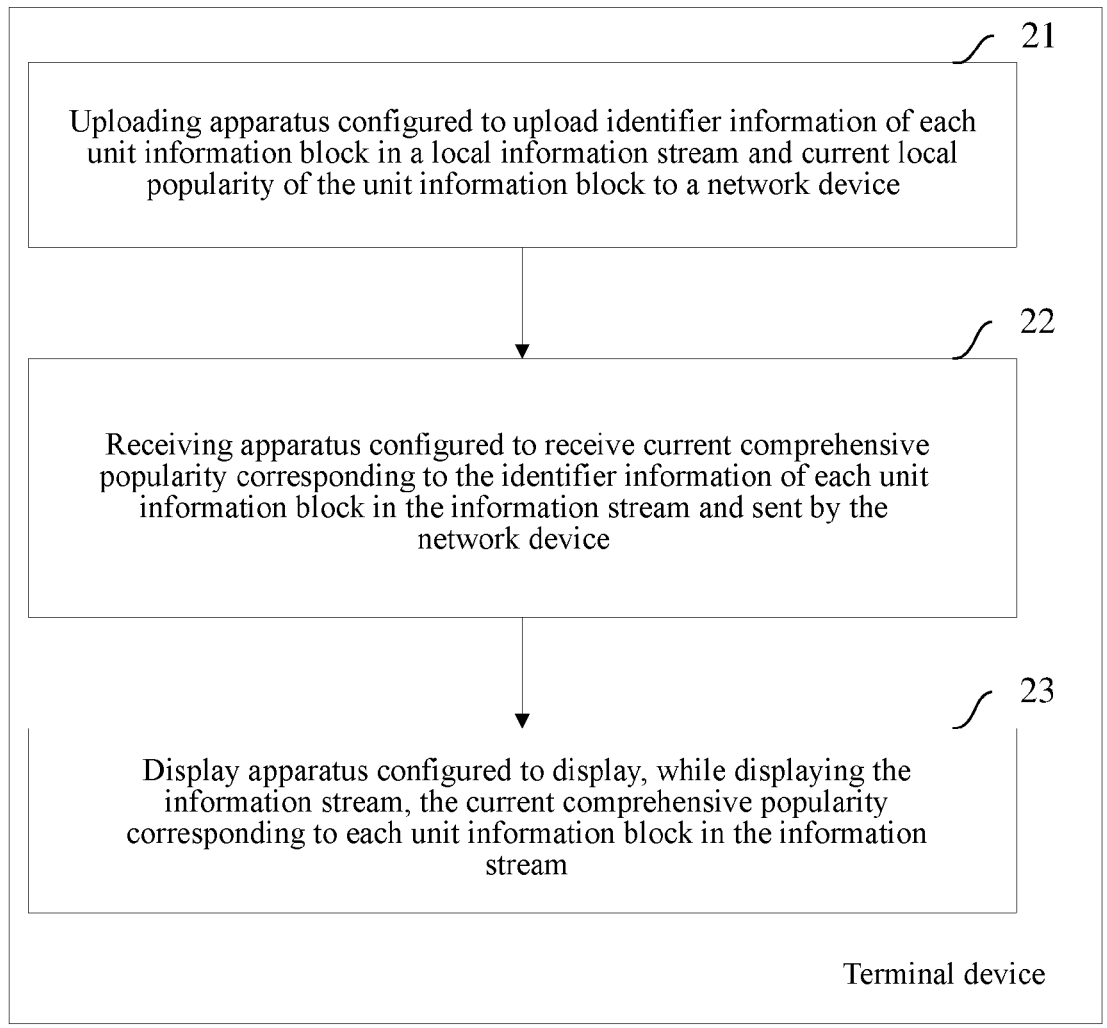
FIG. 7 is a schematic structural diagram of user equipment for obtaining popularity of an information stream according to an aspect of this application.

FIG. 7 is a schematic structural diagram of user equipment for obtaining popularity of an information stream according to an aspect of this application. The user equipment is applied to a user equipment end in instant data communications. The user equipment includes an uploading apparatus 21, a receiving apparatus 22, and a display apparatus 23.

The uploading apparatus 21 is configured to upload identifier information of each unit information block in a local information stream and current local popularity of the unit information block to a network device; then the receiving apparatus 22 configured to receive each unit information block in the information stream and current comprehensive popularity corresponding to the identifier information of the unit information block that are sent by the network device, where the comprehensive popularity is obtained by the network device based on the identifier information of each unit information block in the information stream and the current local popularity corresponding to the unit information block sent by various user equipments; and finally, the display apparatus 23 is configured to display, on the user equipment, while displaying the information stream, the current comprehensive popularity corresponding to each unit information block in the information stream, so that the current comprehensive popularity corresponding to each unit information block in the information stream can be intuitively displayed while the information stream is displayed on the user equipment.

It should be noted that, the information stream includes at least any one of the following: a text information stream, a multimedia information stream, and an image information stream. The text information stream may be formed by a plurality of chat messages, or may be formed by a plurality of news headlines, or may be formed by a plurality of pieces of phrase information, or may be formed by text information in a form of a long text, or the like. The multimedia information stream may be formed by a plurality of videos, or may be formed by a plurality of pieces of voice information, or may be formed by a long video, or may be formed by long voice information, or the like. The image information stream may be formed by a plurality of pieces of image information, or may be formed by a long image, or the like.

Further, the uploading apparatus 21 is further configured to:

receive each unit information block in the information stream and the identifier information of the unit information block that are sent by the network device; and determine, based on the identifier information and local display duration and/or a local click-through rate of the unit information block in the information stream that corresponds to the identifier information, the current local popularity corresponding to the identifier information of each unit information block in the information stream.

For example, the user equipment receives each unit information block in an information stream A sent by the network device, namely, the information stream A: {unit information blocks: a1, a2, a3, a4, a5, and a6}, and the user equipment obtains, according to local display duration and/or a local click-through rate of each unit information block in the information stream A, current local popularity corresponding to identifier information of each unit information block in the information stream A. As the display duration and/or the click-through rate increases, the current local popularity corresponding to the unit information block corresponding to the identifier information also increases. That is, if display duration and/or a click-through rate of the unit information block a1 increases, the current local popularity of the unit information block a1 correspondingly increases, to obtain the current local popularity, namely, {the information stream A: (a1, hota1), (a2, hota2), (a3, hota3), (a4, hota4), (a5, hota5), and (a6, hota6)} corresponding to the identifier information of each unit information block in the information stream A, so that the current local popularity corresponding to the identifier information of each unit information block in the information stream is obtained based on display duration of locally displaying each unit information block by the user equipment and/or a click-through rate of clicking each unit information block by the user equipment, thereby reflecting local popularity of each unit information block in a same information stream.

Further, the uploading apparatus 21 is further configured to receive binding information for each unit information block in the information stream and display progress information corresponding to the unit information block that is sent by the network device. For example, when receiving current comprehensive popularity: {the information stream A: (a1, hot1), (a2, hot2), (a3, hot3), (a4, hot4), (a5, hot5), and (a6, hot6)} corresponding to each unit information block in the information stream A, the user equipment further receives binding information {the information stream A: (a1, L1), (a2, L1), (a3, L3), (a4, L4), (a5, L5), and (a6, L6)} corresponding to each unit information block in the information stream A that is sent by the network device, so that the user equipment intuitively displays, while displaying each unit information block in the information stream in real time, the current comprehensive popularity corresponding to each unit information block, and can further accurately obtain data information in the unit information block that corresponds to the display progress information corresponding to each unit information block in the information stream.

Further, in consideration of resource consumption required when the network device sends the current comprehensive popularity corresponding to each unit information block in the information stream to the user equipment, and resource consumption and memory consumption that are required when the user equipment receives and stores the current comprehensive popularity corresponding to each unit information block in the information stream and sent by network device, the receiving apparatus 22 is further configured to:

send a popularity view request for the information stream to the network device; and then the receiving apparatus 22 receives the current comprehensive popularity corresponding to each unit information block in the information stream, or current comprehensive popularity corresponding to the specified unit information block in the information stream, or current comprehensive popularity corresponding to consecutive adjacent specified unit information blocks in the information stream that is returned by the network device based on the received popularity view request.

The following further describes the receiving apparatus 22 by using an example from three aspects of receiving, by the terminal device, the current comprehensive popularity corresponding to each unit information block in the information stream, or the current comprehensive popularity corresponding to the specified unit information block in the information stream, or the current comprehensive popularity corresponding to consecutive adjacent specified unit information blocks in the information stream that is returned by the network device based on the received popularity view request.

In the first aspect, for example, when the user equipment needs to obtain current comprehensive popularity corresponding to each unit information block in the information stream A, the user equipment sends a popularity view request for the information stream A to the network device; and when receiving the popularity view request, the network device sends the current comprehensive popularity {the information stream A: (a1, hot1), (a2, hot2), (a3, hot3), (a4, hot4), (a5, hot5), and (a6, hot6)} corresponding to each unit information block in the information stream A to the corresponding user equipment, so that the corresponding user equipment receives the current comprehensive popularity {the information stream A: (a1, hot1), (a2, hot2), (a3, hot3), (a4, hot4), (a5, hot5), and (a6, hot6)} corresponding to each unit information block in the information stream A that is returned by the network device based on the popularity view request, thereby reducing resource consumption required when the network device delivers the current comprehensive popularity corresponding to each unit information block in the information streams of all the user equipments, reducing resource consumption required when the user equipment receives the current comprehensive popularity corresponding to each unit information block in the information stream and memory consumption for storage, and further ensuring that when required, the user equipment can obtain, based on the popularity view request, the current comprehensive popularity corresponding to each unit information block in the information stream.

In an embodiment of this application, as shown in FIG. 3, if the information stream is a chat text information stream S001, when needing to view the chat text information stream S001, a user sends a popularity view request for the chat text information stream S001 to the network device, and the user equipment (a smartphone terminal) receives current comprehensive popularity corresponding to each unit information block (namely, each piece of chat information) in the chat text information stream S001, represented in a form of an overall current comprehensive popularity bar S002, and returned by the network device based on the received popularity view request. A current user of the user equipment can view a change in current popularity of each piece of chat information in the chat text information stream S001 based on a color change of the current comprehensive popularity bar S002 of the chat text information stream S001. When the current comprehensive popularity bar S002 is clicked or slid, current chat information corresponding to current display progress information of the chat text information stream S001 is displayed locally, so that the user equipment intuitively displays, while displaying each unit information block in the chat text information stream S001 in real time, the current comprehensive popularity corresponding to each piece of chat information in the chat text information stream S001 and represented in a form of the overall current comprehensive popularity bar S002, and can further accurately obtain data information in the unit information block corresponding to the display progress information corresponding to each piece of chat information in the chat text information stream S001.

In another embodiment of this application, as shown in FIG. 4, if the information stream is a multimedia information stream S003, when needing to view the multimedia information stream S003, a user sends a popularity view request for the multimedia information stream S003 to the network device, and the user equipment (smartphone terminal) receives current comprehensive popularity corresponding to each unit information block (namely, each multimedia unit information block) in the multimedia information stream S003, represented in a form of an overall current comprehensive popularity bar S004, and returned by the network device based on the received popularity view request. The user equipment displays the current comprehensive popularity bar S004 of the multimedia information stream S00 side by side when displaying the multimedia information stream S003. Each unit information block in the current comprehensive popularity bar S004 corresponds to display progress information of the multimedia information stream S003. As a color of the current comprehensive popularity bar S004 changes, a change in current popularity of each multimedia unit information block in the multimedia information stream S003 can be viewed. When the current comprehensive popularity bar S004 is clicked or slid, the current multimedia unit information block corresponding to the current display progress information of the multimedia information stream S003 is displayed locally, so that the user equipment intuitively displays, while displaying each multimedia unit information block in the multimedia information stream S003 in real time, the current comprehensive popularity corresponding to each multimedia unit information block in the multimedia information stream S003 and represented in a form of the overall current comprehensive popularity bar S004, and can further accurately obtain data information in the unit information block corresponding to the display progress information corresponding to each multimedia unit information block in the multimedia information stream S003.

In the second aspect, in consideration of resource consumption required when the network device sends the current comprehensive popularity corresponding to each unit information block in the information stream to the user equipment, and a case in which the user equipment only needs to obtain the current comprehensive popularity corresponding to the specified unit information block in the information stream, the receiving apparatus 22 is further configured to:

send a popularity view request for the specified unit information block in the information stream to the network device; and then the receiving apparatus 22 receives the current comprehensive popularity corresponding to the specified unit information block in the information stream and returned by the network device based on the received popularity view request.

For example, when the user equipment needs to obtain current comprehensive popularity corresponding to the specified unit information blocks a2 and a4 in the information stream A, the user equipment sends a popularity view request for the information stream A in the network device; and when receiving the popularity view request, the network device sends current comprehensive popularity {the information stream A: (a2, hot2) and (a4, hot4)} corresponding to the specified unit information blocks a2 and a4 in the information stream A to the corresponding user equipment, so that the corresponding user equipment receives the current comprehensive popularity {the information stream A: (a2, hot2) and (a4, hot4)} corresponding to the specified unit information blocks a2 and a4 in the information stream A and returned by the network device based on the popularity view request, thereby reducing resource consumption required when the network device delivers the current comprehensive popularity corresponding to each unit information block in the information streams of all the user equipments, and further ensuring that when needing to obtain the specified unit information block in the information stream, the user equipment can obtain, based on the popularity view request, current comprehensive popularity respectively corresponding to the specified unit information block in the information stream, to implement specified view of current popularity of the specified unit information block in the information stream.

In the third aspect, in consideration of resource consumption required when the network device sends the current comprehensive popularity corresponding to each unit information block in the information stream to the user equipment and a case in which the user equipment only needs to obtain the current comprehensive popularity corresponding to the consecutive adjacent specified unit information blocks in the information stream, the receiving apparatus 22 is further configured to:

send a popularity view request for the consecutive adjacent specified unit information blocks in the information stream to the network device; and then the receiving apparatus 22 receives the current comprehensive popularity corresponding to the consecutive adjacent specified unit information blocks in the information stream and returned by the network device based on the received popularity view request.

For example, when the user equipment needs to obtain current comprehensive popularity corresponding to the consecutive adjacent specified unit information blocks a2, a3, and a4 in the information stream A, the user equipment sends a popularity view request for the information stream A to the network device; and when receiving the popularity view request, the network device sends current comprehensive popularity {the information stream A: (a2, hot2), (a3, hot3), and (a4, hot4)} corresponding to the consecutive adjacent specified unit information blocks a2, a3, and a4 in the information stream A to the corresponding user equipment, so that the corresponding user equipment receives the current comprehensive popularity {the information stream A: (a2, hot2), (a3, hot3), and (a4, hot4)} corresponding to the consecutive adjacent specified unit information blocks a2, a3, and a4 in the information stream A and returned by the network device based on the popularity view request, thereby reducing resource consumption required when the network device delivers the current comprehensive popularity corresponding to each unit information block in the information streams of all the user equipments, and further ensuring that when needing to obtain the consecutive adjacent specified unit information blocks in the information stream, the user equipment can obtain, based on the popularity view request, the current comprehensive popularity respectively corresponding to the consecutive adjacent specified unit information blocks in the information stream, to implement specified view of current popularity of the consecutive adjacent specified unit information blocks in the information stream.

Further, the display apparatus 23 is configured to:

display through switching, while displaying the information stream, the current comprehensive popularity and the current local popularity that correspond to each unit information block in the information stream; or display, at the same time, the current comprehensive popularity or the current local popularity corresponding to each unit information block in the information stream.

For example, the user equipment displays through switching, while displaying the information stream A, current comprehensive popularity {the information stream A: (a1, hot1), (a2, hot2), (a3, hot3), (a4, hot4), (a5, hot5), and (a6, hot6)} and current local popularity {the information stream A: (a1, hota1), (a2, hota2), (a3, hota3), (a4, hota4), (a5, hota5), and (a6, hota6)} that correspond to each unit information block in the information stream A, or displays, at the same time, current comprehensive popularity {the information stream A: (a1, hot1), (a2, hot2), (a3, hot3), (a4, hot4), (a5, hot5), and (a6, hot6)} or current local popularity {the information stream A: (a1, hota1), (a2, hota2), (a3, hota3), (a4, hota4), (a5, hota5), and (a6, hota6)} corresponding to each unit information block in the information stream, to intuitively display through switching or display, at the same time, the current comprehensive popularity and the current local popularity that correspond to each unit information block in the information stream, while displaying the information stream A, so that the user equipment can obtain through comparison the current local popularity corresponding to each unit information block in the information stream and the current comprehensive popularity obtained based on various user equipments, thereby improving user experience of the user equipment.

Further, the receiving apparatus 22 is configured to:

receive any one of a current comprehensive popularity bar, a current comprehensive popularity diagram, and a current comprehensive popularity table of the information stream that is generated based on the identifier information of each unit information block in the information stream and the current comprehensive popularity corresponding to the unit information block and that is sent by the network device.

For example, when computing resources of the network device are sufficient and computing resources of the user equipment are strained, any one of a current comprehensive popularity bar, a current comprehensive popularity diagram, and a current comprehensive popularity table of the information stream A is generated based on identifier information of each unit information block in the information stream A and the current comprehensive popularity {an information stream A: (a1, hot1), (a2, hot2), (a3, hot3), (a4, hot4), (a5, hot5), and (a6, hot6)} corresponding to the unit information blocks. That is, the current comprehensive popularity corresponding to each unit information block in the information stream A is represented in a form of any one of a bar, a diagram, or a table. The current comprehensive popularity corresponding to each unit information block in the information stream A is sent to the user equipment in the form of any one of a bar, a diagram, or a table. The user equipment receives any one of the current comprehensive popularity bar, the current comprehensive popularity diagram, and the current comprehensive popularity table of the information stream that is generated based on the identifier information of each unit information block in the information stream and the current comprehensive popularity corresponding to the unit information block and that is sent by the network device, thereby reducing computing resources for generating, by the user equipment, any one of the current comprehensive popularity bar, the current comprehensive popularity diagram, and the current comprehensive popularity table of the information stream based on each unit information block in the information stream.

Further, any one of the current comprehensive popularity bar, the current comprehensive popularity diagram, and the current comprehensive popularity table further includes binding information for each unit information block in the information stream and display progress information corresponding to the unit information block.

For example, any one of the current comprehensive popularity bar, the current comprehensive popularity diagram, and the current comprehensive popularity table further includes binding information obtained by binding each unit information block in the information stream A with display progress information corresponding to the unit information block. If the display progress information is L, the binding information of the information stream A is {the information stream A: (a1, L1), (a2, L1), (a3, L3), (a4, L4), (a5, L5), and (a6, L6)}, any one of the current comprehensive popularity bar, the current comprehensive popularity diagram, and the current comprehensive popularity table of the information stream A further includes the binding information {the information stream A: (a1, L1), (a2, L1), (a3, L3), (a4, L4), (a5, L5), and (a6, L6)}, so that the user equipment intuitively displays, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

Further, the display apparatus 23 is configured to:

generate any one of a current local popularity bar, a current local popularity diagram, and a current local popularity table of the information stream based on the identifier information of each unit information block in the locally stored information stream and the current local popularity corresponding to the unit information block.

For example, when needing to view overall popularity of the current local popularity corresponding to each unit information block in the local information stream A, the user equipment generates, based on the current local popularity corresponding to each unit information block in the locally stored information stream A, any one of the current local popularity bar, the current local popularity diagram, and the current local popularity table of the information stream A. That is, the current local popularity corresponding to each unit information block in the information stream A is represented in a form of any one of a bar, a diagram, or a table, to generate the overall popularity of the current local popularity corresponding to each unit information block in the locally stored information stream, so that a user of the user equipment can view the overall popularity of the current local popularity corresponding to each unit information block in the currently viewed information stream, thereby improving user experience of the user equipment.

Further, any one of the current local popularity bar, the current local popularity diagram, and the current local popularity table further includes the binding information for each unit information block in the information stream and the display progress information corresponding to the unit information block.

For example, any one of the current local popularity bar, the current local popularity diagram, and the current local popularity table further includes binding information obtained by binding each unit information block of the information stream A with display progress information corresponding the unit information block. If the display progress information is L, the binding information of the information stream A is {the information stream A: (a1, L1), (a2, L1), (a3, L3), (a4, L4), (a5, L5), and (a6, L6)}, any one of the current comprehensive popularity bar, the current comprehensive popularity diagram, and the current comprehensive popularity table of the information stream A further includes the binding information {an information stream A: (a1, L1), (a2, L1), (a3, L3), (a4, L4), (a5, L5), and (a6, L6)}, so that the user equipment intuitively displays, while displaying each unit information block in the information stream in real time, any one of the current comprehensive popularity bar/diagram/table corresponding to the overall information stream A, and can further accurately obtain data information in the information stream that corresponds to the display progress information corresponding to each unit information block in the information stream.

Further, the display apparatus 23 is configured to:

perform any one of the following display operations while displaying the information stream:

displaying, through switching, the current comprehensive popularity bar and the current local popularity bar of the information stream;

displaying the current comprehensive popularity bar or the current local popularity bar of the information stream at the same time;

displaying, through switching, the current comprehensive popularity diagram and the current local popularity diagram of the information stream;

displaying, at the same time, the current comprehensive popularity diagram or the current local popularity diagram of the information stream;

displaying, through switching, the current comprehensive popularity table and the current local popularity table of the information stream; or displaying the current comprehensive popularity table or the current local popularity table of the information stream at the same time.

For example, while displaying the information stream A, the user equipment displays through switching, for the information stream A in a form of an overall bar/diagram/table, the current comprehensive popularity {the information stream A: (a1, hot1), (a2, hot2), (a3, hot3), (a4, hot4), (a5, hot5), and (a6, hot6)} and the current local popularity {the information stream A: (a1, hota1), (a2, hota2), (a3, hota3), (a4, hota4), (a5, hota5), and (a6, hota6)} that correspond to each unit information block, or displays, at the same time for the information stream A in a form of an overall bar/diagram/table, the current comprehensive popularity {the information stream A: (a1, hot1), (a2, hot2), (a3, hot3), (a4, hot4), (a5, hot5), and (a6, hot6)} or the current local popularity {the information stream A: (a1, hota1), (a2, hota2), (a3, hota3), (a4, hota4), (a5, hota5), and (a6, hota6)} corresponding to each unit information block, to intuitively display through switching or display, at the same time, the current comprehensive popularity bar/diagram/table and the corresponding current local popularity bar/diagram/table of the information stream while displaying the information stream A, so that the user equipment can obtain through comparison the current comprehensive popularity bar/diagram/table and the corresponding current local popularity bar/diagram/table of the information stream, thereby improving user experience of the user equipment.

According to another aspect of this application, user equipment for obtaining popularity of an information stream is further provided. The user equipment is applied to a user equipment end in instant data communications. The user equipment includes a request sending apparatus and a popularity receiving apparatus. When the user equipment needs to view comprehensive popularity corresponding to a unit information block in a current information stream, the request sending apparatus actively sends a comprehensive popularity view request for a unit information block in a current information stream to a network device; then the popularity receiving apparatus calculates, based on the comprehensive popularity view request, current comprehensive popularity corresponding to each unit information block in the current information stream, so that the user equipment can receive the current comprehensive popularity corresponding to each unit information block in the current information stream and returned by the network device based on the comprehensive popularity view request, thereby ensuring that the user equipment can view, when needing to view the comprehensive popularity corresponding to the unit information block in the current information stream, the corresponding current comprehensive popularity corresponding to each unit information block in the current information stream.

In conclusion, in this application, on a network device end, identifier information of each unit information block in an information stream sent by various user equipments and current local popularity corresponding to the unit information block are obtained; then current comprehensive popularity corresponding to each unit information block in the information stream is obtained based on the identifier information of each unit information block in the information stream and the current local popularity corresponding to the unit information block sent by various user equipments; and the current comprehensive popularity corresponding to each unit information block in the information stream is sent to the user equipment, to calculate and deliver the current comprehensive popularity of each unit information block in the information stream on the network device end, so that the user equipment can display, while displaying the information stream, the current comprehensive popularity of each unit information block in the information stream.

Further, on the network device end, binding information for each unit information block in the information stream and display progress information corresponding to the unit information block are further sent to the user equipment while the current comprehensive popularity corresponding to each unit information block in the information stream is sent to the user equipment, so that the user equipment can intuitively display the corresponding current comprehensive popularity while displaying each unit information block in the information stream in real time, and can further accurately obtain data information in the information stream that corresponds to the display progress information corresponding to each unit information block in the information stream.

Further, in this application, the network device end receives a comprehensive popularity view request for a unit information block in a current information stream that is sent by user equipment; then the network device calculates, based on the comprehensive popularity view request, current comprehensive popularity {an information stream A: (a1, local hota1), (a2, local hota2), (a3, local hota3), (a4, local hota4), (a5, local hota5), and (a6, local hota6)}; corresponding to each unit information block in the current information stream; and finally, the current comprehensive popularity {the information stream A: (a1, local hota1), (a2, local hota2), (a3, local hota3), (a4, local hota4), (a5, local hota5), and (a6, local hota6)} corresponding to each unit information block in the current information stream is sent to the user equipment, so that the network device end calculates, only after receiving the comprehensive popularity view request sent by the user equipment, the current comprehensive popularity corresponding to each unit information block in the current information stream, thereby saving resources for calculating and storing the current comprehensive popularity on the network device end, and further ensuring that the current comprehensive popularity corresponding to each unit information block in the current information stream is fed back to the user equipment when the user equipment sends the comprehensive popularity view request.

Further, in this application, on a user equipment end, identifier information of each unit information block in a local information stream and current local popularity of the unit information block are uploaded to a network device; then each unit information block in the information stream and current comprehensive popularity corresponding to the identifier information of the unit information block that are sent by the network device are received, where the comprehensive popularity is obtained by the network device based on current local popularity corresponding to each unit information block in a same information stream sent by various user equipments; and finally, the current comprehensive popularity corresponding to each unit information block in the information stream is displayed on the user equipment while the information stream is displayed, so that the current comprehensive popularity corresponding to each unit information block in the information stream can be intuitively displayed while the information stream is displayed on the user equipment.

Further, the user equipment further receives, while receiving each unit information block in the information stream and the current comprehensive popularity corresponding to identifier information of the unit information block that are sent by the network device, binding information for each unit information block in the information stream, the identifier information of the unit information block, and display progress information corresponding to the unit information block that is sent by the network device, so that the user equipment can intuitively display, while displaying each unit information block in the information stream in real time, the current comprehensive popularity corresponding to the unit information block, and can further accurately obtain data information in the unit information block that corresponds to the display progress information corresponding to each unit information block in the information stream.

Further, in this application, when needing to view comprehensive popularity corresponding to a unit information block in a current information stream, user equipment actively sends a comprehensive popularity view request for the unit information block in the current information stream to a network device; and then the network device calculates, based on the comprehensive popularity view request, current comprehensive popularity corresponding to each unit information block in the current information stream, so that the user equipment can receive the current comprehensive popularity corresponding to each unit information block in the current information stream and returned by the network device based on the comprehensive popularity view request, thereby ensuring that the user equipment can view, when needing to view comprehensive popularity corresponding to the unit information block in the current information stream, the corresponding current comprehensive popularity corresponding to each unit information block in the current information stream.

Apparently, a person skilled in the art can make various modifications and variations to this application without departing from the spirit and scope of this application. In this way, this application is intended to cover these modifications and variations of this application provided that they fall within the scope of protection defined by the following claims of this application and their equivalent technologies.

It should be noted that this application can be implemented in software and/or a combination of software and hardware, for example, implemented by using an application-specific integrated circuit (ASIC), a general purpose computer, or any other similar hardware device. In an embodiment, a software program in this application can be executed by a processor to implement the steps or the functions described above. Similarly, the software program (including a related data structure) in this application can be stored in a computer-readable recording medium such as a RAM, a magnetic or optical drive, or a floppy disk and a similar device. In addition, some of the steps or the functions in this application may be implemented by hardware, for example, as a circuit that cooperates with a processor to perform various steps or functions.

In addition, a part of this application can be applied as a computer program product, such as a computer program instruction. When the computer program product is executed by a computer, a method and/or technical solutions according to this application can be invoked or provided. The program instruction for invoking the method in this application may be stored in a fixed or removable recording medium, and/or transmitted by a data stream in a broadcast or other signal bearing medium, and/or stored in a working memory of the computer device that runs according to the program instruction. Herein, an embodiment according to this application includes an apparatus. The apparatus includes a memory for storing a computer program instruction and a processor configured to execute the program instruction. When the computer program instruction is executed by the processor, the apparatus is triggered to run the foregoing methods and/or technical solutions according to the plurality of embodiments of this application.

For a person skilled in the art, apparently, this application is not limited to the details of the foregoing exemplary embodiments and this application can be implemented in other specific forms without departing from the spirit or basic characteristics of this application. Therefore, at any point, the embodiments should be considered to be exemplary and non-restrictive, and the scope of this application is limited by the attached claims rather than the foregoing descriptions, and therefore, all changes falling in the meaning and scope of the equivalent of the claims are included in this application. Any reference numeral of the claims should not be considered as a limitation to the involved claim. In addition, apparently, the term "include" does not exclude other units or steps, and singulars do not exclude plurals. A plurality of units or apparatus described in an apparatus claim may also be implemented by a single unit or apparatus through software or hardware. First, second, and other terms are used to represent names, instead of representing any particular order.

What is claimed is:

1. A method for obtaining popularity of an information stream on a network device end, wherein the method comprises:
    obtaining identifier information of a plurality of unit information blocks in an information stream and current local popularity corresponding to the plurality of unit information blocks actively sent by a plurality of user equipment;
    obtaining, based on the identifier information of the plurality of unit information blocks in the information stream and the current local popularity corresponding to the plurality of unit information blocks actively sent by the plurality of user equipment, current comprehensive popularity in real time corresponding to the plurality of unit information blocks in the information stream, wherein the plurality of user equipment actively increases the current local popularity and the current comprehensive popularity by requesting or clicking to receive the unit information blocks of the information stream, wherein the current local popularity corresponding to the identifier information of the plurality of unit information blocks in the information stream is determined based on the identifier information and local display duration and/or a local click-through rate of the plurality of unit information blocks in the information stream that corresponds to the identifier information;
    measuring a quantity and a duration of the unit information blocks for the information stream streamed to a user in determining the current local popularity and the current comprehensive popularity of the information stream;

wherein when the local display duration and/or the local click-through rate increases, the current local popularity corresponding to the unit information block corresponding to the identifier information increases; and sending the current comprehensive popularity corresponding to the plurality of unit information blocks in the information stream to a user device;

wherein the information stream includes at least one of the following: a text information stream, a multimedia information stream, and an image information stream;

wherein the text information stream is formed by a plurality of chat messages, or is formed by a plurality of news headlines, or is formed by a plurality of pieces of phrase information, or is formed by text information in a form of a text;

wherein the multimedia information stream is formed by a plurality of videos, or is formed by a plurality of pieces of voice information, or is formed by a video, or is formed by voice information; and wherein the image information stream is formed by a plurality of pieces of image information, or is formed by an image.

2. The method according to claim 1, wherein during the step of sending the current comprehensive popularity corresponding to the plurality of unit information blocks in the information stream to the user device, the method further comprises:

sending binding information for the plurality of unit information blocks in the information stream and display progress information corresponding to the unit information block to the user device.

3. The method according to claim 2, wherein before the step of sending the current comprehensive popularity corresponding to the plurality of unit information blocks in the information stream to the user device, the method further comprises:

receiving a popularity view request for the information stream sent by the user equipment; and the step of sending the current comprehensive popularity corresponding to the plurality of unit information blocks in the information stream to the user device comprises:

sending, to the user device based on the popularity view request, the current comprehensive popularity corresponding to the plurality of unit information blocks in the information stream, or current comprehensive popularity corresponding to a specified unit information block in the information stream, or current comprehensive popularity corresponding to consecutive adjacent specified unit information blocks in the information stream.

4. The method according to claim 1, wherein the step of sending the current comprehensive popularity corresponding to the plurality of unit information blocks in the information stream to the user device comprises:

generating any one of a current comprehensive popularity bar, a current comprehensive popularity diagram, and a current comprehensive popularity table of the information stream based on the identifier information of the plurality of unit information blocks in the information stream and the current comprehensive popularity corresponding to the plurality of unit information blocks; and sending any one of the current comprehensive popularity bar, the current comprehensive popularity diagram, and the current comprehensive popularity table of the information stream to the user device.

5. The method according to claim 4, wherein any one of the current comprehensive popularity bar, the current comprehensive popularity diagram, and the current comprehensive popularity table further comprises binding information regarding the plurality of unit information blocks in the information stream and display progress information corresponding to the plurality of unit information blocks.

6. The method according to claim 1, wherein before the step of obtaining the identifier information of the plurality of unit information blocks in the information stream and the current local popularity corresponding to the plurality of unit information blocks sent by the plurality of user equipment, the method further comprises:

dividing the obtained information stream, based on a pre-set division manner or original division units of the information stream, to obtain at least one unit information block and identifier information of the at least one unit information block; and sending the at least one unit information block in the information stream and the identifier information of the at least one unit information block to the plurality of user equipment.

7. The method according to claim 1, wherein the step of obtaining, based on the identifier information of the plurality of unit information blocks in the information stream and the current local popularity corresponding to the plurality of unit information blocks sent by the plurality of user equipment, current comprehensive popularity corresponding to the plurality of unit information blocks in the information stream further comprises:

obtaining the current comprehensive popularity corresponding to the plurality of unit information blocks in the information stream according to a pre-set time interval, the identifier information of the plurality of unit information blocks in the information stream and current local popularity corresponding to the plurality of unit information blocks sent by the plurality of user equipment.

8. A method for obtaining popularity of an information stream on a network device end, wherein the method comprises:

receiving a current comprehensive popularity view request for a unit information block in a current information stream actively sent by a user equipment;

calculating, based on the current comprehensive popularity view request, current comprehensive popularity in real time corresponding to the unit information block in the current information stream, wherein the plurality of user equipment actively increases the current local popularity and the current comprehensive popularity by requesting or clicking to receive the unit information blocks of the information stream, wherein the current local popularity corresponding to the identifier information of the plurality of unit information blocks in the information stream is determined based on the identifier information and local display duration and/or a local click-through rate of the plurality of unit information blocks in the information stream that corresponds to the identifier information;

wherein when the local display duration and/or the local click-through rate increases, the current local popularity corresponding to the unit information block corresponding to the identifier information increases; and sending the current comprehensive popularity corresponding to the unit information block in the current information stream to the user equipment;

measuring a quantity and a duration of the unit information blocks for the information stream streamed to a user in determining the current local popularity and the current comprehensive popularity of the information stream;

wherein the information stream includes at least one of the following: a text information stream, a multimedia information stream, and an image information stream;

wherein the text information stream is formed by a plurality of chat messages, or is may be formed by a plurality of news headlines, or is formed by a plurality of pieces of phrase information, or is formed by text information in a form of a text;

wherein the multimedia information stream is formed by a plurality of videos, or is formed by a plurality of pieces of voice information, or is formed by a video, or is formed by voice information; and wherein the image information stream is formed by a plurality of pieces of image information, or is formed by an image.

9. The method according to claim 8, wherein before the step of receiving the current comprehensive popularity view request for the unit information block in the current information stream sent by the user equipment, the method further comprises:

obtaining identifier information of the unit information block in the information stream and current local popularity corresponding to the unit information block sent by a plurality of user equipment; and the step of calculating, based on the current comprehensive popularity view request, current comprehensive popularity corresponding to the unit information block in the current information stream comprises:

calculating the current comprehensive popularity corresponding to the unit information block in the current information stream, based on the current comprehensive popularity view request, the identifier information of the unit information block in the information stream and the current local popularity corresponding to the unit information block.

10. A method for obtaining popularity of an information stream on a user equipment end, wherein the method comprises:

uploading identifier information of a plurality of unit information blocks in a local information stream and current local popularity of the plurality of unit information blocks to a network device;

receiving current comprehensive popularity in real time corresponding to the identifier information of the plurality of unit information blocks in the information stream and sent by the network device, wherein the current comprehensive popularity is obtained by the network device based on the identifier information of the plurality of unit information blocks in the information stream and the current local popularity corresponding to the plurality of unit information blocks actively sent by a plurality of user equipment, wherein the plurality of user equipment actively increases the current local popularity and the current comprehensive popularity by requesting or clicking to receive the unit information blocks of the information stream, wherein the current local popularity corresponding to the identifier information of the plurality of unit information blocks in the information stream is determined based on the identifier information and local display duration and/or a local click-through rate of the plurality of unit information blocks in the information stream that corresponds to the identifier information;

measuring a quantity and a duration of the unit information blocks for the information stream streamed to a user in determining the current local popularity and the current comprehensive popularity of the information stream;

wherein when the local display duration and/or the local click-through rate increases, the current local popularity corresponding to the unit information block corresponding to the identifier information increases; and displaying, while displaying the information stream, the current comprehensive popularity corresponding to the plurality of unit information blocks in the information stream;

wherein the information stream includes at least one of the following: a text information stream, a multimedia information stream, and an image information stream;

wherein the text information stream is formed by a plurality of chat messages, or is formed by a plurality of news headlines, or is formed by a plurality of pieces of phrase information, or is formed by text information in a form of a text;

wherein the multimedia information stream is formed by a plurality of videos, or is formed by a plurality of pieces of voice information, or is formed by a video, or is formed by voice information; and wherein the image information stream is formed by a plurality of pieces of image information, or is formed by an image.

11. The method according to claim 10, wherein during the step of receiving the current comprehensive popularity corresponding to the identifier information of the plurality of unit information blocks in the information stream and sent by the network device, the method further comprises:

receiving binding information sent by the network device regarding the plurality of unit information blocks in the information stream and display progress information corresponding to the plurality of unit information blocks.

12. The method according to claim 10, wherein before the step of receiving the current comprehensive popularity corresponding to the identifier information of the plurality of unit information blocks in the information stream and sent by the network device, the method further comprises:

sending a popularity view request for the information stream to the network device; and the step of receiving the current comprehensive popularity corresponding to the identifier information of the plurality of unit information blocks in the information stream and sent by the network device comprises:

receiving the current comprehensive popularity corresponding to the plurality of unit information blocks in the information stream, or current comprehensive popularity corresponding to a specified unit information block in the information stream, or current comprehensive popularity corresponding to consecutive adjacent specified unit information blocks in the information stream returned by the network device based on the received popularity view request.

13. The method according to claim 10, wherein the step of displaying, while displaying the information stream, the current comprehensive popularity corresponding to the plurality of unit information blocks in the information stream comprises:

displaying through switching, while displaying the information stream, the current comprehensive popularity and the current local popularity that correspond to the plurality of unit information blocks in the information stream; or displaying, the current comprehensive popularity or the current local popularity corresponding to the plurality of unit information blocks in the information stream.

14. The method according to claim 10, wherein the step of receiving the current comprehensive popularity corresponding to the identifier information of the plurality of unit information blocks in the information stream and sent by the network device comprises:

receiving any one of a current comprehensive popularity bar, a current comprehensive popularity diagram, and a current comprehensive popularity table of the information stream sent by the network device generated based on the identifier information of the plurality of unit information blocks in the information stream and the current comprehensive popularity corresponding to the plurality of unit information blocks.

15. The method according to claim 14, wherein any one of the current comprehensive popularity bar, the current comprehensive popularity diagram, and the current comprehensive popularity table further comprises binding information for the plurality of unit information blocks in the information stream and display progress information corresponding to the plurality of unit information blocks.

16. The method according to claim 15, wherein before the step of displaying, while displaying the information stream, the current comprehensive popularity corresponding to the plurality of unit information blocks in the information stream, the method further comprises:

generating any one of a current local popularity bar, a current local popularity diagram, and a current local popularity table of the information stream based on the identifier information of the plurality of unit information blocks in the information stream and locally stored current local popularity corresponding to the plurality of unit information blocks.

17. The method according to claim 16, wherein any one of the current local popularity bar, the current local popularity diagram, and the current local popularity table further comprises the binding information regarding the plurality of unit information blocks in the information stream and the display progress information corresponding to the plurality of unit information blocks.

18. The method according to claim 17, wherein the step of displaying, while displaying the information stream, the current comprehensive popularity corresponding to the plurality of unit information blocks in the information stream comprises:

performing any one of the following display operations while displaying the information stream:

displaying, through switching, the current comprehensive popularity bar and the current local popularity bar of the information stream;

displaying, the current comprehensive popularity bar or the current local popularity bar of the information stream at the same time;

displaying, through switching, the current comprehensive popularity diagram and the current local popularity diagram of the information stream;

displaying, the current comprehensive popularity diagram or the current local popularity diagram of the information stream;

displaying, through switching, the current comprehensive popularity table and the current local popularity table of the information stream; or displaying the current comprehensive popularity table or the current local popularity table of the information stream at the same time.

19. The method according to claim 10, wherein before the step of uploading identifier information of the plurality of unit information blocks in a local information stream and the current local popularity of the plurality of unit information blocks to a network device, the method further comprises:

receiving the plurality of unit information blocks in the information stream and the identifier information of the plurality of unit information blocks sent by the network device.

20. A method for obtaining popularity of an information stream on a user equipment end, wherein the method comprises:

actively sending a current comprehensive popularity view request for a unit information block in a current information stream to a network device; and receiving current comprehensive popularity in real time corresponding to the unit information block in the current information stream and returned by the network device based on the current comprehensive popularity view request, wherein the plurality of user equipment actively increases the current local popularity and the current comprehensive popularity by requesting or clicking to receive the unit information blocks of the information stream, wherein the current local popularity corresponding to the identifier information of the plurality of unit information blocks in the information stream is determined based on the identifier information and local display duration and/or a local click-through rate of the plurality of unit information blocks in the information stream that corresponds to the identifier information;

measuring a quantity and a duration of the unit information blocks for the information stream streamed to a user in determining the current local popularity and the current comprehensive popularity of the information stream;

wherein when the local display duration and/or the local click-through rate increases, the current local popularity corresponding to the unit information block corresponding to the identifier information increases;

wherein the information stream includes at least one of the following: a text information stream, a multimedia information stream, and an image information stream;

wherein the text information stream is formed by a plurality of chat messages, or is formed by a plurality of news headlines, or is formed by a plurality of pieces of phrase information, or is formed by text information in a form of a text;

wherein the multimedia information stream is formed by a plurality of videos, or is formed by a plurality of pieces of voice information, or is formed by a video, or is formed by voice information; and wherein the image information stream is formed by a plurality of pieces of image information, or is formed by an image.

* * * * *